(12) United States Patent
Seko et al.

(10) Patent No.: US 8,170,329 B2
(45) Date of Patent: May 1, 2012

(54) POSITION MEASURING SYSTEM, POSITION MEASURING METHOD AND COMPUTER READABLE MEDIUM

(75) Inventors: Yasuji Seko, Ashigarakami-gun (JP);
Hiroyuki Hotta, Ashigarakami-gun (JP);
Yasuyuki Saguchi, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 665 days.

(21) Appl. No.: 12/398,268

(22) Filed: Mar. 5, 2009

(65) Prior Publication Data

US 2010/0014750 A1  Jan. 21, 2010

(30) Foreign Application Priority Data

Jul. 18, 2008  (JP) .................... 2008-187720

(51) Int. Cl.
*G06K 9/00* (2006.01)
(52) U.S. Cl. ........................................ 382/154
(58) Field of Classification Search .............. 382/154
See application file for complete search history.

(56) References Cited

U.S. PATENT DOCUMENTS

| | | | | |
|---|---|---|---|---|
| 5,748,505 A * | 5/1998 | Greer | | 702/104 |
| 6,574,361 B1 | 6/2003 | Kawakami et al. | | |
| 6,985,236 B2 | 1/2006 | Seko et al. | | |
| 7,529,387 B2 * | 5/2009 | Kotake et al. | | 382/103 |
| 7,558,403 B2 * | 7/2009 | Katayama et al. | | 382/103 |
| 7,657,065 B2 * | 2/2010 | Kotake et al. | | 382/106 |
| 7,742,895 B2 * | 6/2010 | Seko et al. | | 702/152 |
| 7,860,298 B2 * | 12/2010 | Leikas et al. | | 382/154 |
| 2003/0215130 A1 * | 11/2003 | Nakamura et al. | | 382/154 |
| 2004/0170315 A1 * | 9/2004 | Kosaka et al. | | 382/154 |
| 2004/0202364 A1 * | 10/2004 | Otani et al. | | 382/154 |
| 2005/0123188 A1 * | 6/2005 | Leikas et al. | | 382/154 |
| 2006/0239525 A1 * | 10/2006 | Katayama et al. | | 382/128 |
| 2010/0014750 A1 * | 1/2010 | Seko et al. | | 382/154 |

FOREIGN PATENT DOCUMENTS

| | | |
|---|---|---|
| JP | 11-283031 A | 10/1999 |
| JP | 2000-357235 A | 12/2000 |
| JP | 2003-223639 A | 8/2003 |
| JP | 2004-192342 A | 7/2004 |
| JP | 2004-212328 A | 7/2004 |
| JP | 2005-534026 A | 11/2005 |
| WO | 2004/011876 A1 | 2/2004 |

* cited by examiner

*Primary Examiner* — Sath V Perungavoor
(74) *Attorney, Agent, or Firm* — Sughrue Mion, PLLC

(57) ABSTRACT

A position measuring system includes: an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points; an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit.

20 Claims, 19 Drawing Sheets

POSITION MEASURING SYSTEM, POSITION MEASURING METHOD AND COMPUTER READABLE MEDIUM

CROSS REFERENCE TO RELATED APPLICATIONS

This application is based on and claims priority under 35 USC §119 from Japanese Patent Application No. 2008-187720 filed Jul. 18, 2008.

BACKGROUND

1. Technical Field

The present invention relates to a position measuring system and a position measuring method that measure a position and angles of an object (the direction to which an object is directed, and the like) in a three-dimensional space, and a computer readable medium storing a program that causes a computer to execute a process for position measurement.

2. Related Art

As a method for measuring the three-dimensional position of an object, often used is a method of calculating position coordinates of the object by capturing images of the object with two cameras and then employing triangulation using the distance between the cameras as a base line. In a case where a positional relationship between six points arranged in a three-dimensional space is known beforehand, on the basis of an image of the six points captured by a camera, calculation may be performed to obtain the position, defined by the six points, of the object in the three-dimensional space (the three-dimensional position, hereinafter) and the angles (the roll angle, pitch angle, and yaw angle; referred to as the three-axial angles, hereinafter).

However, in a case of reading a symbol for indicating information added to an object, the shapes of the symbol in images to be obtained vary depending on the position and angles of the object in relation to the camera. Such being the case, techniques for identifying the symbol on the basis of a captured symbol image by using a certain geometric invariant, regardless of the position and angles of the object in a three-dimensional space, have been proposed.

SUMMARY

According to an aspect of the invention, there is provided a position measuring system including: an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points; an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit.

BRIEF DESCRIPTION OF THE DRAWINGS

Exemplary embodiment (s) of the present invention will be described in detail based on the following figures, wherein.

DETAILED DESCRIPTION

An exemplary embodiment of the present invention will be described below in detail with reference to the accompanying drawings.

<System Configuration>

Figure 1:
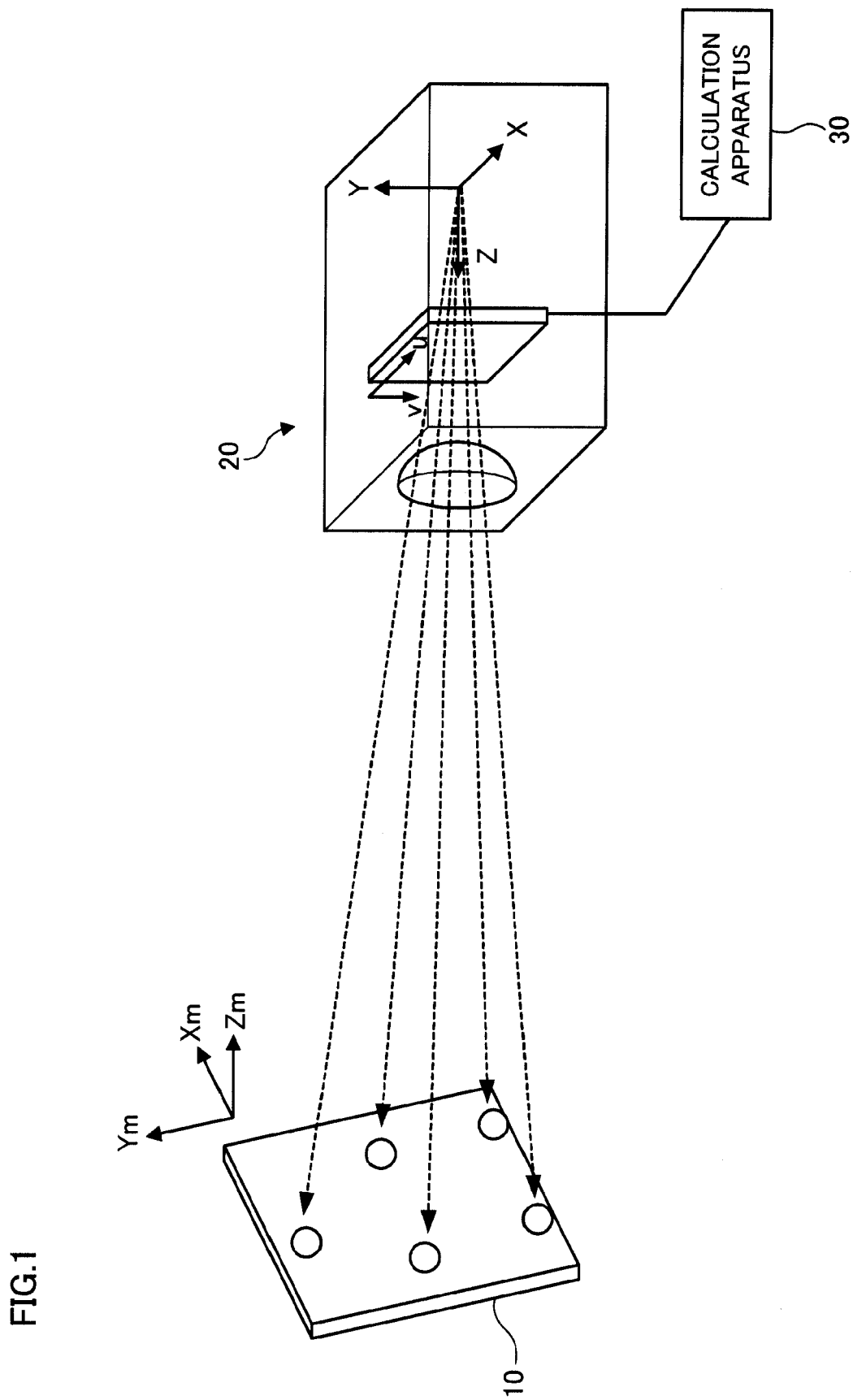
FIG. 1 is a diagram showing an entire configuration of a position measuring system to which the present exemplary embodiment is applied.

FIG. 1 is a diagram showing an entire configuration of a position measuring system to which this exemplary embodiment is applied.

As shown in FIG. 1, the position measuring system of the present exemplary embodiment includes: a target 10, an image of which is to be captured; a camera 20, which captures the image of the target 10; and a calculation apparatus 30, which calculates the three-dimensional position and the three-axial angles of the target 10 on the basis of the image captured by the camera 20.

Figure 2B:
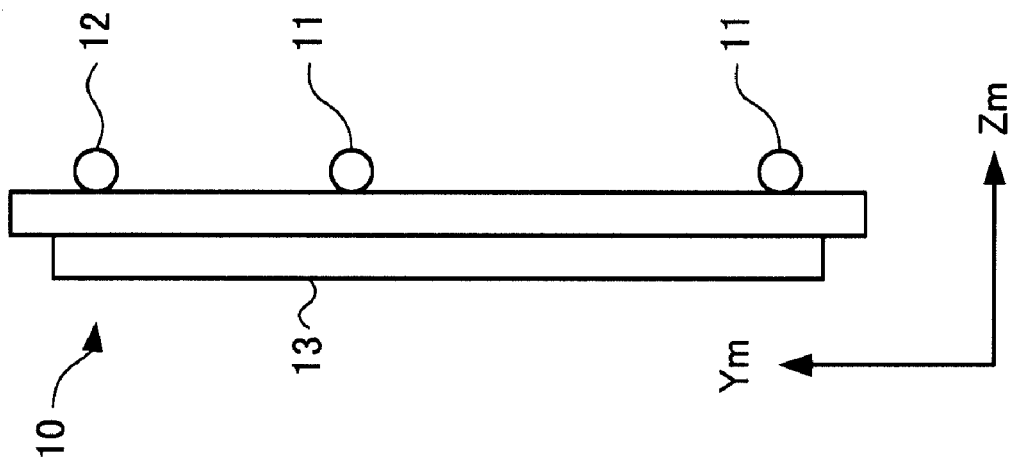
FIGS. 2A and 2B are diagrams showing a configuration of a target.
Figure 2A:
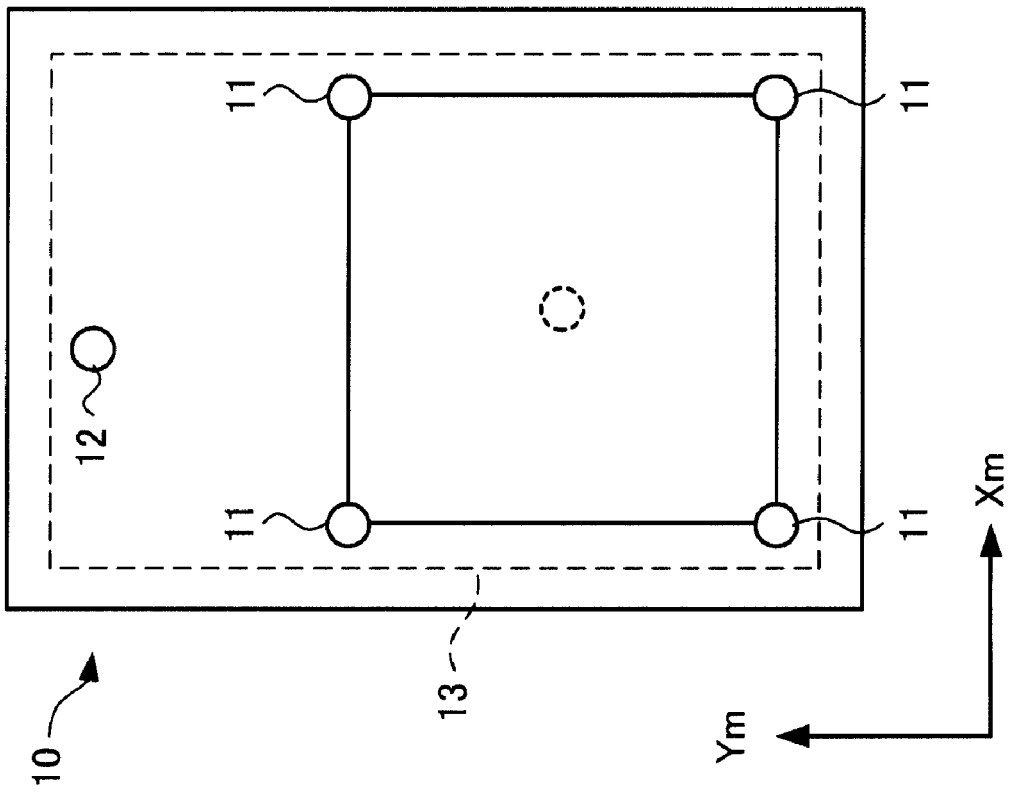

FIGS. 2A and 2B are diagrams showing a configuration of the target 10. FIG. 2A is a front view, and FIG. 2B is a side view.

As shown in FIGS. 2A and 2B, the target 10 is provided with: reference markers 11 used for calculation of the three-dimensional position and the three-axial angles of the target 10; and a symbol marker 12 used for addition of information to the target 10. The reference markers 11 and the symbol marker 12 are in a predefined positional relationship, and are formed of LEDs. The target 10 also includes a light emission controller 13, which controls light emission of the LEDs.

The target 10 is provided with four or more reference markers 11. Here, two examples of the reference markers 11 will be proposed. In the first example, four or more reference markers 11 are provided on the same plane of a surface of the target 10. In the second example, three or more reference markers 11 are provided on the same plane of a surface of the target 10 and one reference marker 11 is provided at a certain height from the plane. In the first example, the four or more reference markers 11 are arranged in accordance with a certain geometric positional relationship on the plane. Specifically, the reference markers 11 are provided respectively at vertices of a regular polygon, or at vertices and a barycenter of a regular polygon. In addition to these arrangements, various examples of the actual arrangement of the reference markers 11 are conceivable, which will be described later in detail. In the second example, the one reference marker 11 provided at the certain height from the plane is provided around a barycenter of a polygon that is formed by joining the other three or more reference markers 11. Concrete positional relationships between the reference markers 11 will also be described later in detail.

The symbol marker 12 and the reference markers 11 are provided on the same plane. The position of the symbol marker 12 is specified by a relationship with the reference markers 11, and has several examples according to the arrangement of the reference markers 11, which will be described later in detail. The number of symbol markers 12 to be used is limited on the basis of a positional relationship with the reference markers 11, but is allowed to be arbitrary within the limitation. Moreover, the symbol markers 12 are capable of representing certain information based on the number of the symbol markers 12 and the positional relationship between the symbol markers 12 themselves.

In FIGS. 1, 2A and 2B, a card-like object with the reference markers 11 and the symbol marker 12 (which will be referred to as the markers 11 and 12 hereinafter when the reference markers 11 and the symbol marker 12 do not need to be distinguished) provided thereon is shown as the target 10. However, since the three-dimensional position and the three-axial angles of the target 10 is calculated on the basis of marker images of the reference markers 11 captured by the camera 20 in the present exemplary embodiment, the target 10 itself is not restricted to any particular shape or size as long as the reference markers 11 and the symbol marker 12 are in the above-described positional relationships.

As described above, the target 10 itself is certainly not restricted to any particular shape or size from a viewpoint of obtaining marker images by capturing an image of the markers 11 and 12 and thereby distinguishing the reference markers 11 and the symbol marker 12. However, since the target 10 is, in actual, an object which moves in a three-dimensional space and turns around, the size of the target 10 is limited to some extent. Moreover, the target 10 is provided with a plane region on which the markers 11 and 12 are provided. In addition, in consideration of convenience of image capturing with the camera 20, application of an affine transformation to be described later for identification of the markers 11 and 12, and the like, the size of the region is also limited (a rectangle 40 mm to 90 mm on a side, for example), in practice.

Figure 3:
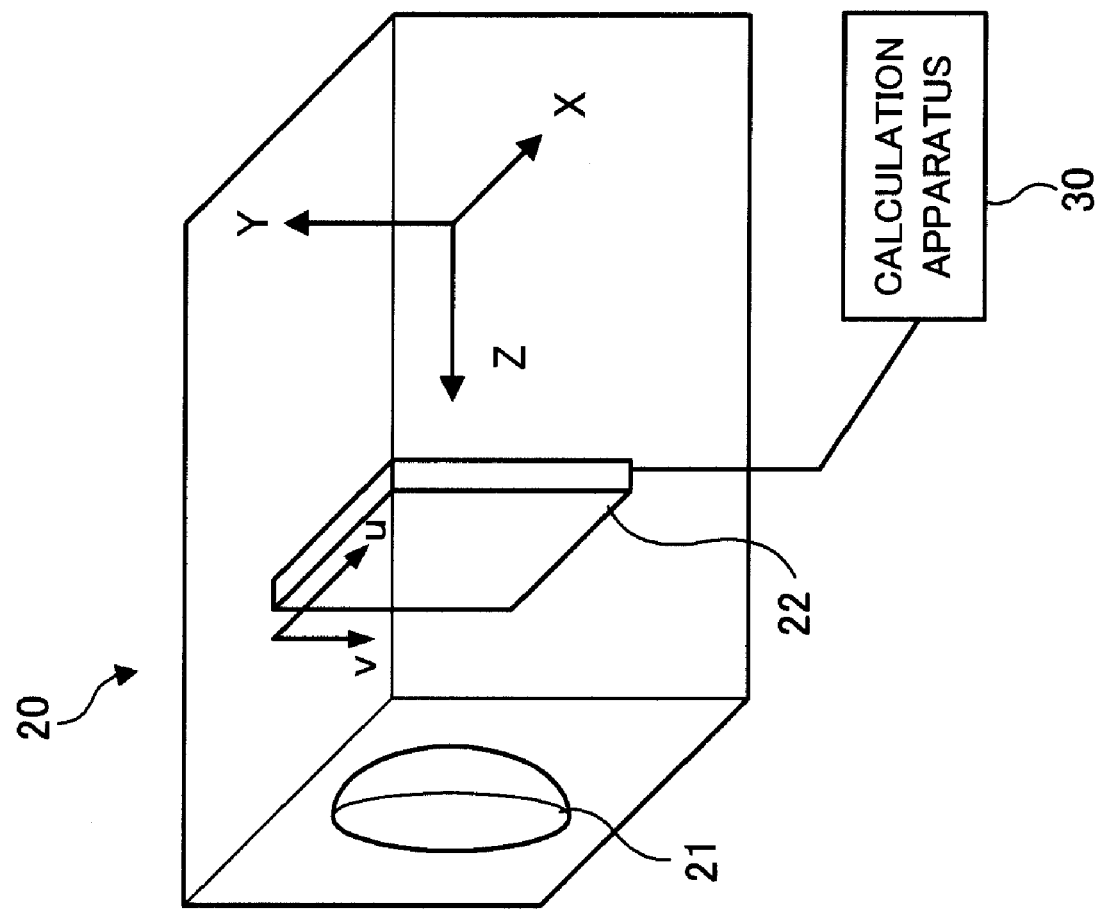
FIG. 3 is a diagram showing a configuration example of a camera.

FIG. 3 is a diagram showing a configuration example of the camera 20.

The camera 20 includes: an optical system 21, which focuses light emitted from the markers 11 and 12; and an image sensor 22, which is an image capturing unit detecting the light focused by the optical system 21.

The optical system 21 is composed of a single lens or combined multiple lenses. Various kinds of aberration are canceled by a lens combination, coating applied to a surface of a lens, and the like.

The image sensor 22 is composed of arrayed imaging elements, such as charged coupled devices (CCDs) and complementary metal oxide semiconductors (CMOSs). A surface of the image sensor 22 serves as an image capturing surface of the camera 20. By providing, on a front face of the image sensor 22, a filter suitable for emission wavelengths of the LEDs used as the markers 11 and 12, untargeted light is eliminated, and consequently an image including only the markers 11 and 12 is captured. Specifically, assume that an emission wavelength of the LEDs used as the markers 11 and 12 is 900 nm, for example. In this case, a filter which allows only light having a wavelength of larger than 850 nm to pass therethrough is provided on the front face of the image sensor 22.

The calculation apparatus 30 is implemented by a personal computer, for example. The calculation apparatus 30 obtains image data of the marker images captured by the image sensor 22 of the camera 20, and thereby calculates the three-dimensional positions of the reference markers 11 and the symbol marker 12 corresponding respectively to the marker images. Subsequently, on the basis of the obtained three-dimensional positions of the reference markers 11, the three-dimensional position and the three-axial angles of the target 10 are calculated. In addition, the calculation apparatus 30 identifies the marker corresponding to each of the marker images, on the basis of the calculated three-dimensional positions of the markers.

<Calculation of Three-dimensional Position and Three-axial Angles of Target 10 in First Example>

Next, a description will be given of a method for the calculation apparatus 30 to calculate the three-dimensional position and the three-axial angles of the target 10 on the basis of the positions of the reference markers 11 in the first example where the four reference markers 11 are provided on the same plane. In the following description, the reference markers 11 and the symbol marker 12 are assumed to be already identified. Identification methods of the markers 11 and 12 will be described later.

First, as shown in FIG. 1 to FIG. 3, coordinate systems are set. Specifically, three kinds of coordinate systems are set: a marker coordinate system $[X_m, Y_m, Z_m]^T$ indicating the position of each reference marker 11 on the target 10; a sensor coordinate system $[u, v]^T$ set on the image capturing surface of the image sensor 22; and a camera coordinate system $[X_c, Y_c, Z_c]^T$ indicating the position coordinates to be measured. Thereby, on the basis of the coordinate values of the image of the reference markers 11, captured by the image sensor 22, in the sensor coordinate system and the positional relationship of the actual reference markers 11 in the marker coordinate system, the positions of the reference markers 11 in the camera coordinate system (the positions in relation to the camera 20) are obtained. A calculation method will be described below in detail.

First, a pinhole camera model is applied to perform normalized projection of a point ($X_c$, $Y_c$, $Z_c$) of the camera coordinate system as Expression 1.

$$\begin{bmatrix} u_n \\ v_n \end{bmatrix} = \begin{bmatrix} X_c/Z_c \\ Y_c/Z_c \end{bmatrix}$$ [Expression 1]

The value obtained by applying lens distortion after the normalized projection is denoted by $[u_d\ v_d]^T$, and is shown as Expression 2.

$$\begin{bmatrix} u_d \\ v_d \end{bmatrix} = (1 + k_1 r^2 + k_2 r^4 + k_3 r^6) \begin{bmatrix} u_n \\ v_n \end{bmatrix} + \begin{bmatrix} 2 1_1 u_n v_n + 1_2(r^2 + 2u_n^2) \\ 1_1(r^2 + 2v_n^2) + 2 1_2 u_n v_n \end{bmatrix}$$ [Expression 2]

Here, $k_i$ (i=1 to 3) and $l_j$ (j=1, 2) are correction coefficients of the camera 20.

Next, as Expression 3 shows, multiplying Expression 2 by an internal camera parameter matrix (C) gives the sensor coordinates $[u_p, v_p]$ of an image point whose image is to be actually captured.

$$\begin{bmatrix} u_p \\ v_p \\ 1 \end{bmatrix} = \begin{bmatrix} -f & f/\cot\theta & o_x \\ 0 & -f/\sin\theta & o_y \\ 0 & 0 & 1 \end{bmatrix} \begin{bmatrix} u_d \\ v_d \\ 1 \end{bmatrix}$$ [Expression 3]

Here, f denotes a focal length of the optical system 21 of the camera 20, ($o_x$, $o_y$) denotes the image center, and $\theta$ denotes the angle made by the x-axis and the y-axis in the sensor coordinate system.

Here, the relationship shown in Expression 4 is established between the sensor coordinate system obtained by the camera calibration and the marker coordinate system.

$$\begin{bmatrix} hu_p \\ hv_p \\ h \end{bmatrix} = \begin{bmatrix} P_{11} & P_{12} & P_{14} \\ P_{21} & P_{22} & P_{24} \\ P_{31} & P_{32} & 1 \end{bmatrix} \begin{bmatrix} u_d \\ v_d \\ 1 \end{bmatrix}$$ [Expression 4]

Here, the matrix on the right-hand side of Expression 4 is a projection matrix P, and is originally composed of three rows and four columns. However, since the reference markers 11 are located on the same plane, the z-axis coordinate $Z_m$ of the marker coordinates of each reference marker 11 is zero, and is thus omitted, as shown in Expression 4. Accordingly, the number of unknowns of the projection matrix P is eight.

Expression 4 is convertible into two constraint equations as Expressions 5 below.

$$X_m P_{11} + Y_m P_{12} + P_{14} - u X_m P_{31} - u Y_m P_{32} = u$$

$$X_m P_{21} + Y_m P_{22} + P_{24} - v X_m P_{31} - v Y_m P_{32} = v$$ [Expressions 5]

Entering four pairs of the marker coordinates ($X_m, Y_m$) (the marker coordinates of the four reference markers 11) and the image point ($u_p, v_p$) into Expressions 5 gives solutions of the eight unknowns of the projection matrix shown as Expression 4. In other words, an image including the four reference markers 11 whose arrangement positions are already known is captured by the camera 20, the image positions are substituted into Expressions 5, and the projection matrix is thereby solved.

The projection matrix is denoted by P3. Then P3 is expressed as the product of an internal camera parameter C and external parameter as follows.

$$P3 = C \cdot [r1\ r2\ t]$$

Here, r denotes a vector of each column of a rotation matrix, and t denotes a translation vector of the rotation matrix. The column vector r3 is orthogonal to r1 and r2, and is thus expressed as follows.

$$r3 = r1 \times r2$$

By the above calculation, the column vectors of all the three columns are obtained, and the rotation matrix r is consequently obtained. In addition, the translation vector t indicating the three-dimensional position coordinates is also obtained. Thus, the three-dimensional position and the angles of the target 10 on which the four reference markers 11 are provided are measured. When the three-dimensional position of each reference marker 11 is denoted by $[X_c\ Y_c\ Z_c]^T$, the position in the camera coordinate system is expressed as follows.

$$[X_c\ Y_c\ Z_c]^T = r \cdot [X_m\ Y_m\ Z_m]^T + t$$

<Marker Identification on Images in First Example>

Next, a description will be given of a method for the calculation apparatus 30 to identify each of the marker images of the reference markers 11 and the symbol marker 12 on the basis of an image captured by the camera 20 in the first example where the four reference markers 11 are provided on the same plane.

In the present exemplary embodiment, the reference markers 11 and the symbol marker 12 are arranged on the target 10 to satisfy certain geometric features. Then, on the basis of the geometric features, each marker image captured by the camera 20 is determined whether to be the marker image of the reference marker 11 or the symbol marker 12. Here, features preserved before and after an affine transformation are used, for example, as the geometric features. An affine transformation is an approximation of a perspective projection transformation serving as an actual camera model, and results in a close approximation if a target is relatively small in size. Thus, to use an affine transformation, the shape that is formed by joining the marker images captured by the camera 20 corresponds to the shape that is formed by joining the reference markers 11 and the symbol marker 12 and that is subjected to an affine transformation.

As described in relation to the target 10 with reference to FIGS. 2A and 2B, the size of the region of the target 10 on which the markers 11 and 12 are arranged is limited to be within a realistic range. Accordingly, in practice, the markers 11 and 12 are arranged at such positions that satisfy various conditions to be described below, within the region defined on the target 10.

Figure 4:
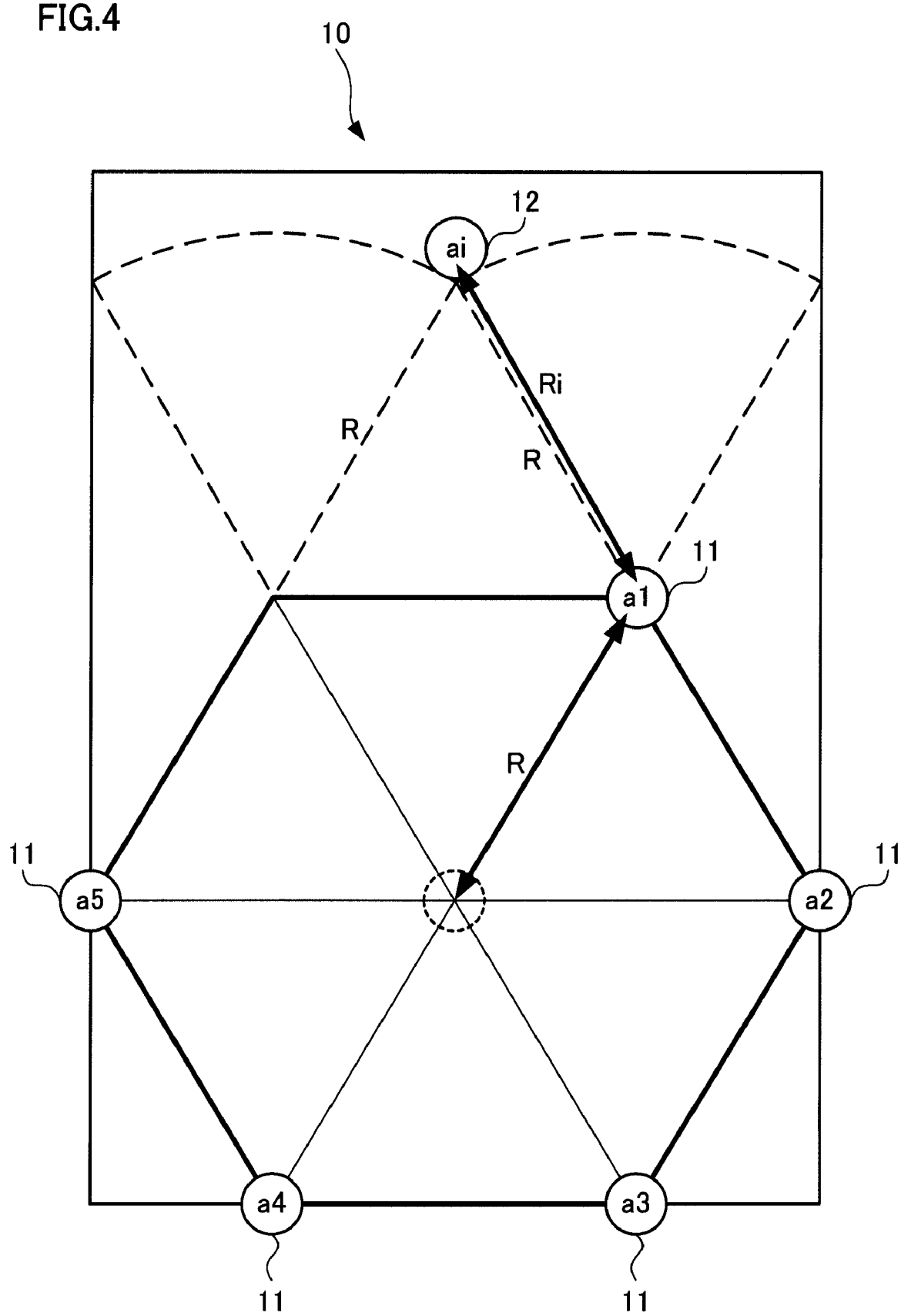
FIG. 4 is a diagram showing a first arrangement example of the reference markers and the symbol marker.

FIG. 4 is a diagram showing a first arrangement example of the reference markers 11 and the symbol marker 12.

In the example shown in FIG. 4, five reference markers 11 are provided respectively at five vertices of a regular hexagon, while a single symbol marker 12 is provided at such a position that the distance Ri from the position of the symbol marker 12 to the closest vertex among the vertices of the regular hexagon and the length R of each side of the regular hexagon would satisfy Ri>R.

In order to identify each of the marker images of the reference markers 11 and the symbol marker 12 in an image captured by the camera 20, this positional relationship between the reference markers 11 themselves and also this positional relationship between the symbol marker 12 and the reference markers 11 are used. Specifically, the reference markers 11 are provided respectively at the vertices of the regular hexagon with each side of length R while the symbol marker 12 is provided at the position of the distance Ri (>R) from the closest reference marker 11. Accordingly, also in the image captured by the camera 20, the distance between the marker images of the symbol marker 12 and the reference marker 11 closest to the symbol marker 12 is longer than the distance between the marker images of any two adjacent reference markers 11 as long as the inclination of the target 10 in relation to the camera 20 is within a certain range. On the basis of this fact, for each of the marker images captured by the camera 20, the distance between the marker image and a different marker image closest to the marker image is detected, the longest distance is selected from the detected distances, and the marker image having the longest distance from the closest marker image is identified as the symbol marker 12. Consequently, the rest of the marker images are identified as the marker images of the reference markers 11.

Figure 5B:
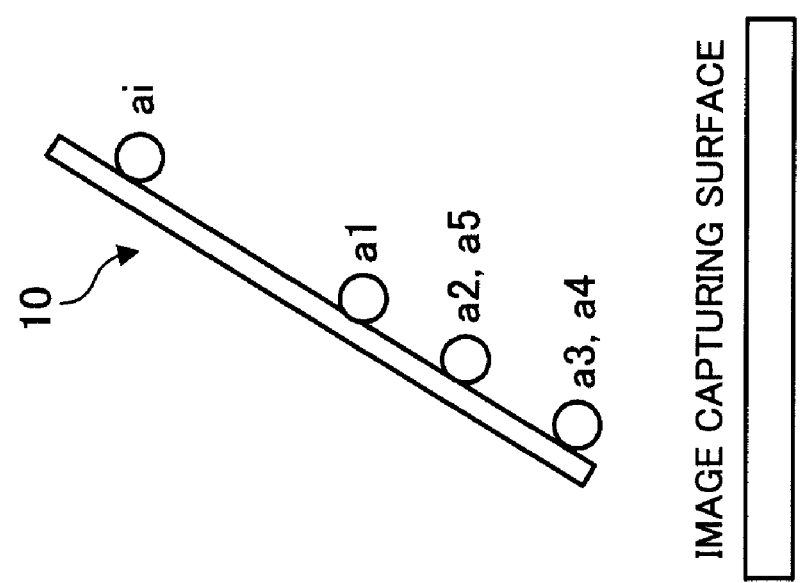
FIGS. 5A and 5B are diagrams showing a state where the target is inclined with respect to the camera in the first arrangement example shown in FIG. 4.
Figure 5A:
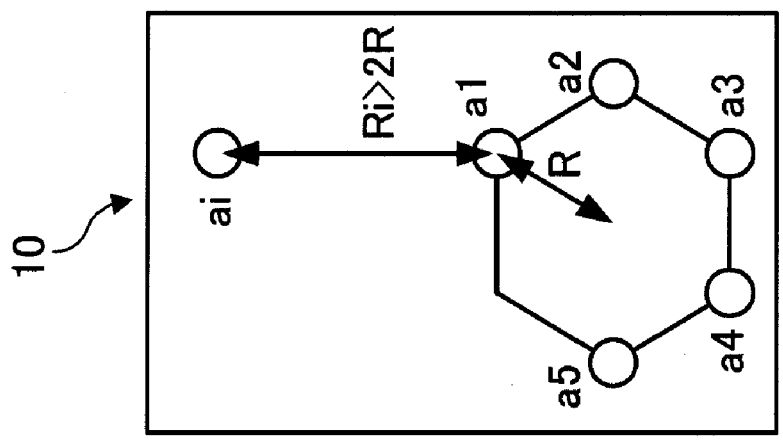

As a concrete example, assume that the target 10 is inclined with respect to the camera 20 as shown in FIGS. 5A and 5B. In FIGS. 5A and 5B, a1 to a5 denote the reference markers 11, and ai denotes the symbol marker 12. In this case, in the positional relationships between the marker images of the two adjacent reference markers 11, the distance between a3 and a4 is the longest. Here, for example, if Ri>2R, the distance between a1 and ai is longer than the distance between a3 and a4 even if the target 10 is inclined at 60° at the maximum with respect to the camera 20. In other words, as long as the angle of the target 10 with respect to the camera 20 is equal to or smaller than 60°, the marker images of the reference markers 11 and the symbol marker 12 are successfully identified; thus, no practical problem arises.

Figure 6:
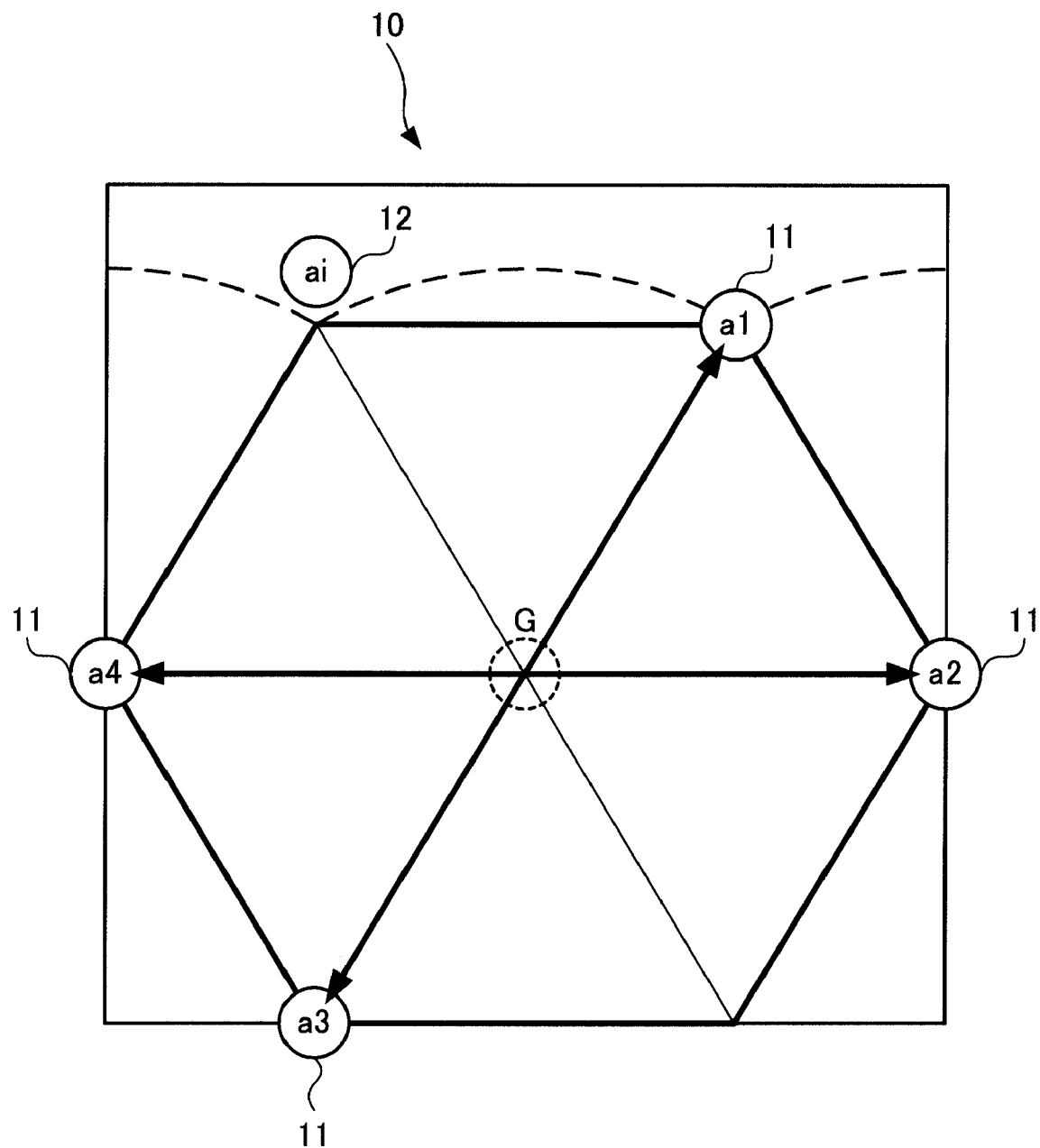
FIG. 6 is a diagram showing a second arrangement example of the reference markers and the symbol marker.

FIG. 6 is a diagram showing a second arrangement example of the reference markers 11 and the symbol marker 12.

In the example shown in FIG. 6, four reference markers 11 are provided respectively at four vertices of a regular hexagon. The four vertices are composed of two pairs of vertices, the vertices of each pair having a symmetric positional relationship with respect to a barycenter of the regular hexagon. In FIG. 6, a pair of a1 and a3, and a pair of a2 and a4 each have a symmetric positional relationship with respect to the barycenter G. A single symbol marker 12 is provided at a position that does not correspond to any of the vertices of the regular hexagon and that does not form any parallelogram in combination with any three reference markers 11.

A barycenter of a polygon and a symmetric positional relationship with respect to the barycenter are features preserved before and after an affine transformation. In other words, if the polygon formed by the reference markers 11 arranged on the target 10 is transformed by an affine transformation, the barycenter position of the original polygon corresponds to the barycenter position of the polygon after the transformation. Moreover, vertices having a symmetric positional relationship with respect to the barycenter still have a symmetric positional relationship with respect to the barycenter in the polygon after an affine transformation. Thus, if the reference markers 11 and the symbol marker 12 are arranged as described above, the barycenter of the regular hexagon formed by the reference markers 11 is still preserved in the image captured by the camera 20. Specifically, the position of the barycenter in the captured image is the position of the barycenter of the hexagon formed by the marker images of the reference markers 11 and the positions corresponding to the rest of the vertices of the original regular hexagon. Furthermore, the marker images of the reference markers 11 having a symmetric positional relationship with respect to the barycenter (that is, a1 and a3, as well as a2 and a4) are located at positions having a symmetric positional relationship with respect to the barycenter in the captured image. On the basis of the geometrical features, each of the marker images is identified as the marker image of either the reference marker 11 or the symbol marker 12.

Specifically, first, any four marker images are chosen from the five marker images, and the barycenter of the quadrilateral formed by joining the four chosen marker images is then obtained. Here, the position of the barycenter of the quadrilateral formed by joining the four vertices of the regular hexagon agrees with the position of the barycenter of the original regular hexagon, if the four vertices are composed of two pairs of vertices, and each of the paired vertices has a symmetric positional relationship with respect to the barycenter of the regular hexagon. Therefore, if the four chosen marker images are all the marker images of the reference markers 11, any two marker images that are not adjacent to each other among the four chosen marker images are located at positions that are symmetric with respect to the previously obtained barycenter of the quadrilateral. Such relationships are not established if the symbol marker 12 is included in the four chosen marker images, because the symbol marker 12 is provided at a position that does not form any parallelogram in combination with any three reference markers 11. Accordingly, if the above-described relationships are established by the four chosen marker images, the four marker images are identified as the marker images of the reference markers 11, and the remaining marker image is identified as the marker image of the symbol marker 12.

Figure 7:
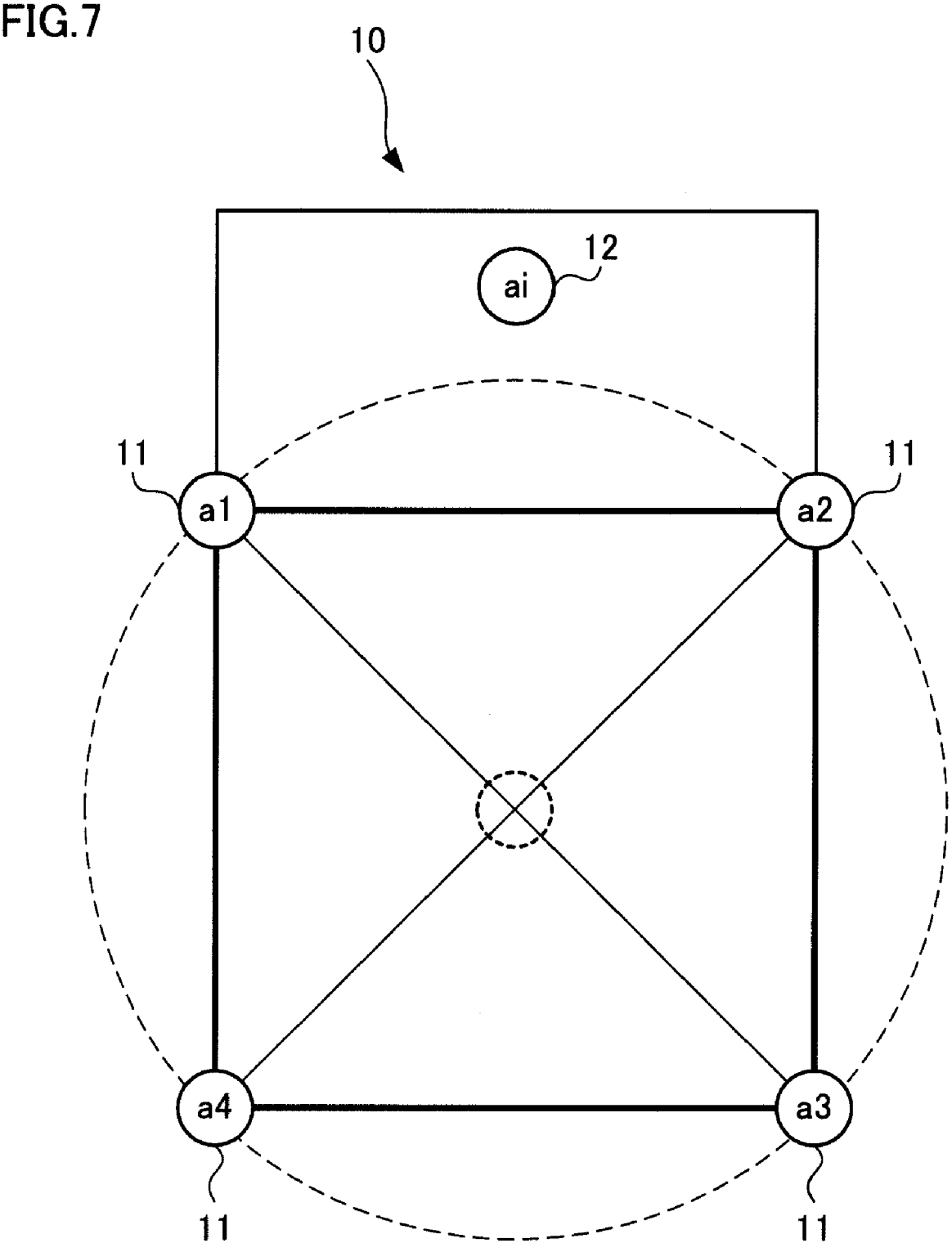
FIG. 7 is a diagram showing a third arrangement example of the reference markers and the symbol marker.

FIG. 7 is a diagram showing a third arrangement example of the reference markers 11 and the symbol marker 12.

In the example shown in FIG. 7, four reference markers 11 are provided respectively at the four vertices of a square. Any two vertices that are not adjacent to each other among the four vertices of the square are located at positions that are symmetric with respect to the barycenter of the square. A single symbol marker 12 is provided at a position that does not correspond to any of the vertices of the square. Since the four reference markers 11 are provided so as to form a square, the symbol marker 12 forms no parallelogram in combination with any three reference markers 11.

In this arrangement, the same geometric features as those used in the second arrangement example described above with reference to FIG. 6 are used. Specifically, the geometric features are: the position of the barycenter of a polygon; and vertices having a symmetric positional relationship with respect to the barycenter. Therefore, the procedure for identifying each marker image as the marker image of either the reference marker 11 or the symbol marker 12 is as follows.

First, any four marker images are chosen from the five marker images, and a barycenter of a quadrilateral formed by joining the four chosen marker images is then obtained. Thereafter, an examination is made whether two marker images that are not adjacent to each other among the four chosen marker images are located at positions that are symmetric with respect to the obtained barycenter of the quadrilateral. If the marker images do not have such relationships, another combination of four marker images is chosen, and the same processing is performed on the marker images. On the other hand, if the marker images have such relationships, the four chosen marker images are identified as the marker images of the reference markers 11, and the remaining marker image is identified as the marker image of the symbol marker 12.

Figure 8:
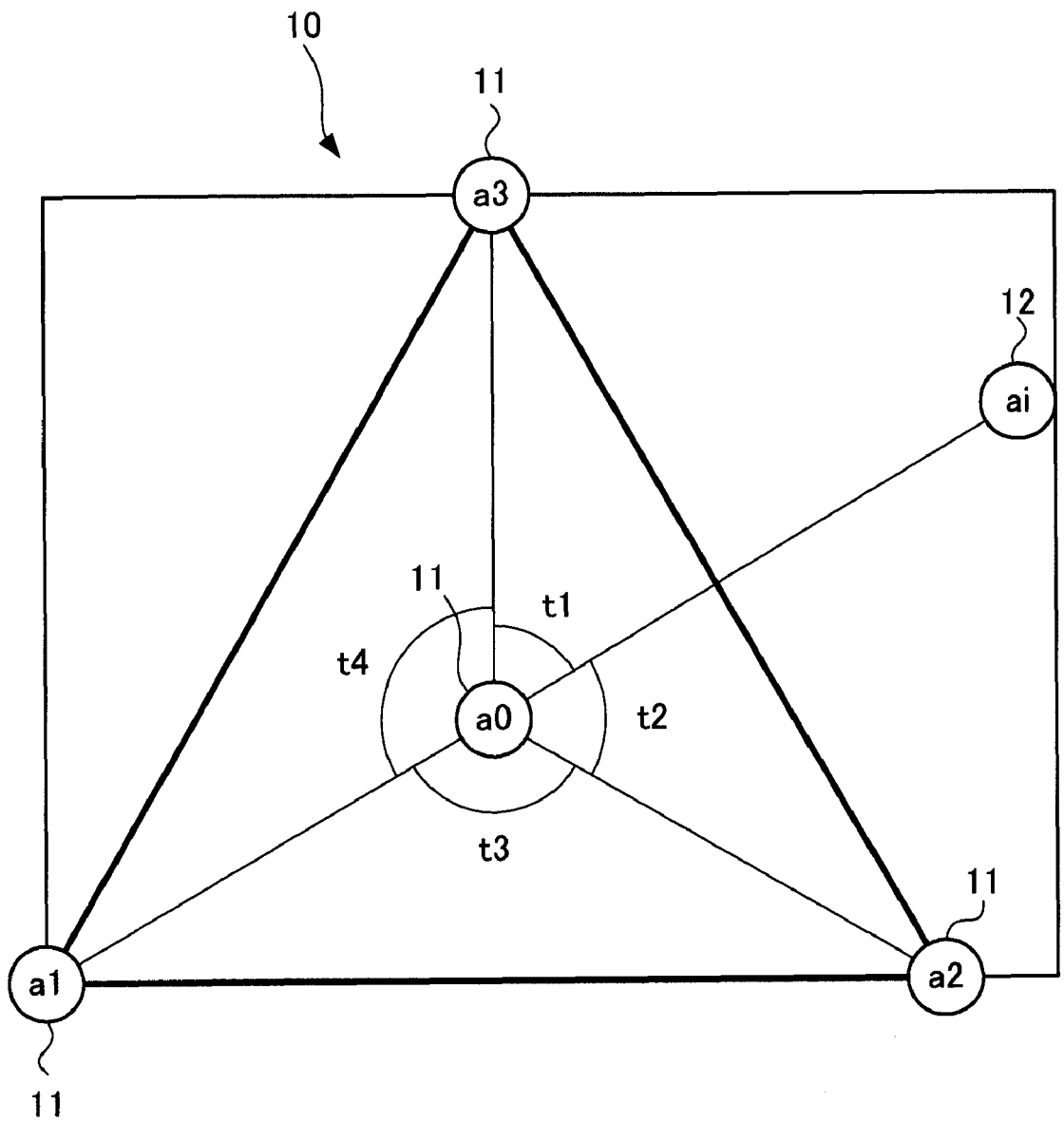
FIG. 8 is a diagram showing a fourth arrangement example of the reference markers and the symbol marker.

FIG. 8 is a diagram showing a fourth arrangement example of the reference markers 11 and the symbol marker 12.

In the example shown in FIG. 8, three out of four reference markers 11 are provided respectively at vertices of a regular triangle, and the remaining reference marker 11 is provided at a barycenter of the regular triangle. A single symbol marker 12 is provided at a position that does not correspond to any of the vertices of the regular triangle, and where distances from each of the barycenter and the vertices of the regular triangle to the symbol marker 12 are the same as or larger than the distance from the barycenter to each of the vertices.

In this arrangement, the angles each between reference markers 11 of the two adjacent vertices (a1 and a2, a2 and a3, or a3 and a1) with the reference marker 11 (a0) located at the barycenter of the regular triangle as the vertex of angle are equal, i.e. 120°. Accordingly, for each of the reference markers 11 (a1, a2 and a3) located at the vertices, excluding the reference marker 11 (a0) located at the barycenter, if two angles each between the reference marker 11 and an adjacent reference marker 11 with the reference marker 11 (a0) located at the barycenter as the vertex of angle are added, the resulting angle is 240° (in FIG. 8, for example, angle t3+angle t4=240°). The symbol marker 12 (ai) is, on the other hand, located between a pair of two adjacent vertices (between a2 and a3 in FIG. 8) when seen from the reference marker 11 (a0) located at the barycenter. Accordingly, if two angles each between the symbol marker 12 (ai) and an adjacent reference marker 11 with the reference marker 11 (a0) located at the barycenter as the vertex of angle are added, the resulting angle is 120° (in FIG. 8, angle t1+angle t2=120°). On the basis of the geometric features, each marker image is identified as the marker image of either the reference marker 11 or the symbol marker 12.

Specifically, first, any four marker images are chosen from the five marker images, and the barycenter of the quadrilateral formed by joining the four chosen marker images is then obtained. The position of the barycenter of the regular triangle formed by joining the reference markers 11 (a1, a2 and a3) is considered not to be deviated, to a large extent, from that of the barycenter of the quadrilateral formed by joining the above reference markers 11 and the symbol marker 12 (ai). If the angle of the target 10 with respect to the camera 20 is within a practical range, the reference marker 11 (a0) is considered to be located at a position closest to the barycenter of the quadrilateral (a1a2a3ai). On the basis of this idea, an examination is made whether any marker image is located near the obtained barycenter (within a certain distance). If such a marker image is found, the four chosen marker images are the marker images of the reference markers 11 (a1, a2 and a3) located at the vertices of the regular triangle and the symbol marker 12 (ai). Here, the marker image located near the barycenter of the quadrilateral is the marker image of the reference marker 11 (a0) located at the barycenter of the regular triangle.

Subsequently, for each of the four chosen marker images, two angles each between the marker image and an adjacent marker image with the marker image of the reference marker 11 (a0) located at the barycenter as the vertex of angle are added. The marker image having the smallest calculated value is identified as the marker image of the symbol marker 12 (ai), and the rest of the marker images are identified as the marker images of the reference markers 11 (a1, a2 and a3) located at the vertices of the regular triangle.

Figure 9:
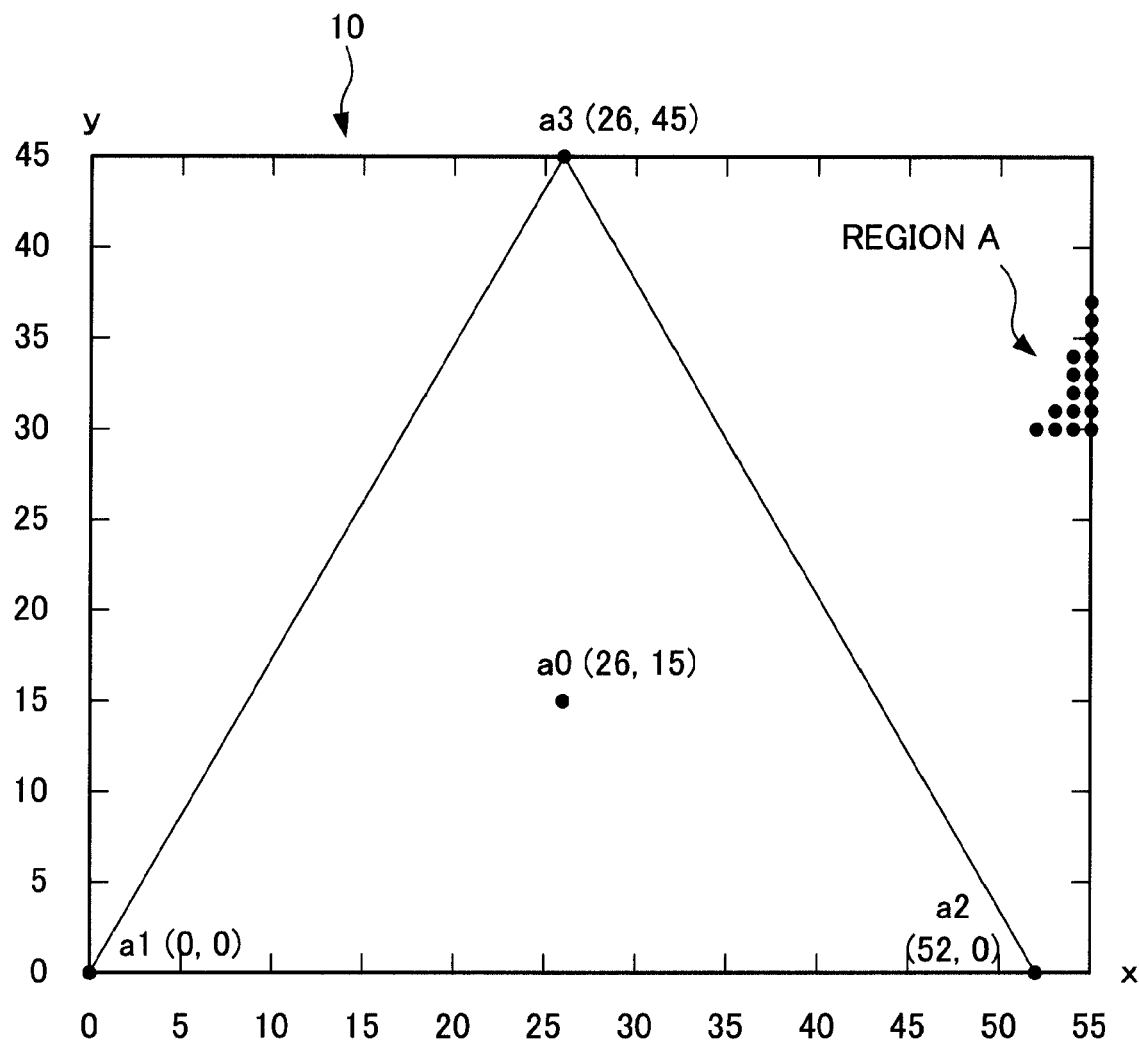
FIG. 9 is a graph showing a concrete arrangement example of the markers on the target in the fourth arrangement example shown in FIG. 8.

FIG. 9 is a graph showing a concrete arrangement example of the markers 11 and 12 on the target 10 in the fourth arrangement example shown in FIG. 8.

In the example shown in FIG. 9, a rectangle region that is 45 mm long and 55 mm wide is defined on the target 10, and the markers 11 and 12 are provided in the region. The target 10 itself may have a card shape of this size, or a region of this size may be defined on the target 10 having arbitrary shape. For convenience of explanation, in FIG. 9, orthogonal coordinates (x-y coordinates) are provided in the region with scales indicating horizontal direction (x direction) positions and vertical direction (y direction) positions. The markers 11 and 12 are determined to be located in millimeters, and are arranged in this region accordingly.

In the example shown in FIG. 9, the reference markers 11 are provided at the following positions.

$a1: (x, y)=(0, 0)$ $a2: (x, y)=(52, 0)$ $a3: (x, y)=(26, 45)$ $a0: (x, y)=(26, 15)$

Among these, the three reference markers 11, a1, a2 and a3, form a regular triangle 52 mm on a side. As shown in FIG. 9, this triangle is formed so that a side a1-a2 would be aligned with a side of the region defined on the target 10.

Here, as described above with reference to FIG. 8, the symbol marker 12 is provided at a position that does not correspond to any of the vertices (a1, a2 and a3) of the regular triangle, and where distances from each of the barycenter (a0) and the vertices of the regular triangle to the symbol marker 12 are the same as or larger than the distance from the barycenter to each of the vertices (R=30 mm). In FIG. 9, a region (region A) that satisfies these conditions (that is, a region in which the symbol marker 12 is allowed to be provided) is shown. Assume that a distinguishable pitch is 1 mm in this region. This allows the symbol marker 12 to be arranged in 16 different ways.

Figure 10:
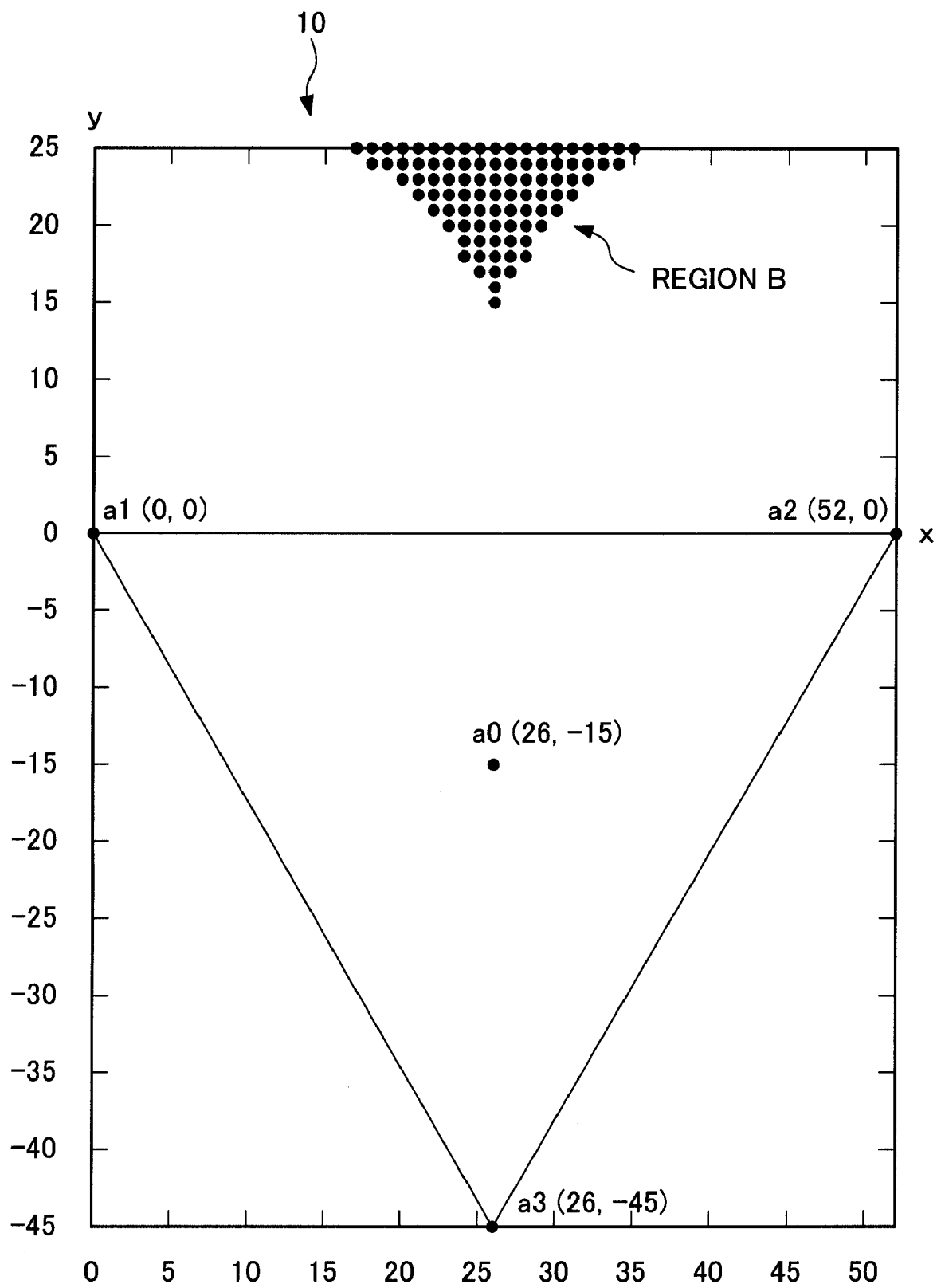
FIG. 10 is a graph showing another concrete arrangement example of the markers on the target in the fourth arrangement example shown in FIG. 8.

FIG. 10 is a graph showing another concrete arrangement example of the markers 11 and 12 on the target 10 in the fourth arrangement example shown in FIG. 8.

In the example shown in FIG. 10, a rectangle region that is 70 mm long and 52 mm wide is defined on the target 10, and the markers 11 and 12 are provided in the region. As in the example shown in FIG. 9, this region is for the markers 11 and 12 to be arranged therein, and is not intended to restrict the shape of the target 10 itself. In addition, also as in the example shown in FIG. 9, orthogonal coordinates (x-y coordinates) are provided in the region with scales indicating horizontal direction (x direction) positions and vertical direction (y direction) positions. Moreover, the markers 11 and 12 are determined to be located in millimeters, and are arranged in this region accordingly.

In the example shown in FIG. 10, the reference markers 11 are provided at the following positions.

$a1: (x, y)=(0, 0)$ $a2: (x, y)=(52, 0)$ $a3: (x, y)=(26, -45)$ $a0: (x, y)=(26, -15)$

Among these, the three reference markers 11, a1, a2 and a3, form a regular triangle 52 mm on a side. Unlike the triangle shown in FIG. 9, this triangle is formed so that none of the sides would be aligned with any side of the region defined on the target 10, and so that a side a1-a2 would be parallel to the horizontal direction (x direction).

Here, as described above with reference to FIG. 8, the symbol marker 12 is provided at a position that does not correspond to any of the vertices of the regular triangle (a1a2a3), and where distances from each of the barycenter (a0) and the vertices of the regular triangle are the same as or larger than the distance from the barycenter to each of the vertices (R=30 mm). In FIG. 10, a region (region B) that satisfies these conditions (that is, a region in which the symbol marker 12 is allowed to be arranged) is shown. Assume that a distinguishable pitch is 1 mm in this region. This allows the symbol marker 12 to be provided in 91 different ways.

Figure 11:
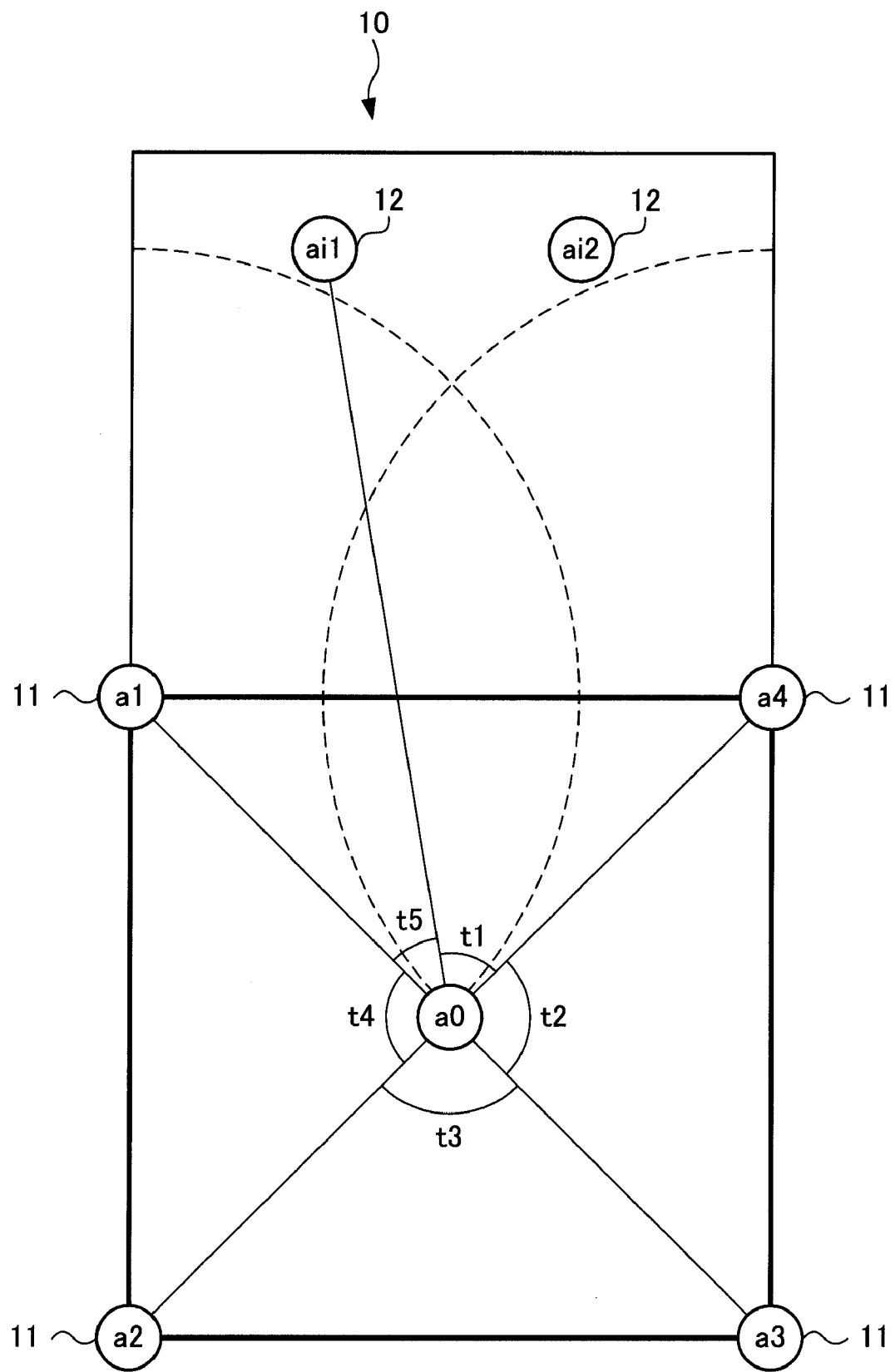
FIG. 11 is a diagram showing a fifth arrangement example of the reference markers and the symbol marker.

FIG. 11 is a diagram showing a fifth arrangement example of the reference markers 11 and the symbol marker 12. In the example shown in FIG. 11, four out of five reference markers 11 are provided respectively at the four vertices of a square, and the remaining reference marker 11 is positioned at the barycenter of the square. A symbol marker 12 is provided at a position that does not correspond to any of the vertices of the square and that does not form any parallelogram in combination with any three reference markers 11. In the example shown in FIG. 11, to secure such a position that the symbol marker 12 would not form any parallelogram in combination with any three reference markers 11, the distance between the symbol marker 12 and each of the reference markers 11 would be longer than the distance from each of the vertices of the square formed by joining the reference markers 11 to the barycenter of the square. Although this arrangement is used in both cases where a single symbol marker 12 is provided and where multiple symbol markers 12 are provided, a method of identifying the marker image of each reference marker 11 and symbol marker 12 to be employed is different depending on whether a single or multiple symbol markers 12 are used.

First, an identification method in a case where a single symbol marker 12 is used will be described.

In this arrangement, the angles each between reference markers 11 of any two adjacent vertices (a1 and a2, a2 and a3, a3 and a4, or a4 and a1) with the reference marker 11 (a0) located at the barycenter of the square as the vertex of angle are all equal, i.e. 90°. Accordingly, for each of the reference markers 11 (a1, a2, a3 and a4) located at the vertices, excluding the reference marker 11 (a0) located at the barycenter, if two angles each between the reference marker 11 and an adjacent reference marker with the reference marker 11 (a0) located at the barycenter as the vertex of angle are added, the resulting angle is 180° (in FIG. 11, for example, angle t2+angle t3=180°). The symbol marker 12 (ai) is, on the other hand, located between a pair of two adjacent vertices (between a1 and a4 in FIG. 11) when seen from the reference marker 11 (a0) located at the barycenter. Accordingly, if two angles each between the symbol marker 12 (ai) and an adjacent reference marker 11 with the reference marker 11 (a0) located at the barycenter as the vertex of angle are added, the resulting angle is 90° (in FIG. 11, angle t1+angle t5=90°). On the basis of the geometric features, each marker image is identified as the marker image of either the reference marker 11 or the symbol marker 12.

Specifically, first, any five marker images are chosen from the six marker images, and a barycenter of a pentagon formed by joining the five chosen marker images is then obtained. The position of the barycenter of the square formed by joining the reference markers 11 (a1, a2, a3 and a4) is considered not to be deviated, to a large extent, from that of a barycenter of a pentagon formed by joining the above reference markers 11 and the symbol marker 12 (ai). If the angle of the target 10 with respect to the camera 20 is within a practical range, the reference marker 11 (a0) is considered to be located at a position closest to the barycenter of the pentagon (a1a2a3a4ai). On the basis of this idea, an examination is made whether any marker image is located near the obtained barycenter (within a certain distance). If such a marker image is found, the five chosen marker images are the marker images of the reference markers 11 (a1, a2, a3 and a4) located at the vertices of the square and the symbol marker 12 (ai). Here, the marker image located near the barycenter of the pentagon (i.e. the marker image that is not chosen) is the marker image of the reference marker 11 (a0) located at the barycenter of the square.

Subsequently, for each of the five chosen marker images, two angles each between the marker image and an adjacent marker image with the marker image of the reference marker 11 (a0) located at the barycenter as the vertex of angle are added. The marker image having the smallest calculated value is identified as the marker image of the symbol marker 12 (ai), and the rest of the marker images are identified as the marker images of the reference markers 11 (a1, a2, a3 and a4) located at the vertices of the square.

Next, another identification method in a case where a single symbol marker 12 is used will be described.

In the arrangement shown in FIG. 11, all the reference markers 11 (that is, a1, a2, a3 and a4), except the reference marker 11 (a0) located at the barycenter of the square, and the symbol marker 12 (ai) are placed around the reference marker 11 (a0) at the barycenter position. This is a geometric feature, together with the barycenter position of a polygon, preserved before and after an affine transformation. Based on these geometric features, first, the six marker images are divided into two, that is, a single marker image and five marker images placed around the single marker image. Further, any four marker images are chosen from the five marker images around the single marker image. Thereafter, an examination is made whether the single marker image previously separated from the others is located at a barycenter of a quadrilateral formed by joining the four chosen marker images. If such a marker image is found, the four chosen marker images are the marker images of the reference markers 11 (a1, a2, a3 and a4), and the marker image at the barycenter position is the marker image of the reference marker 11 (a0). Further, the remaining marker image is the marker image of the symbol marker 12 (ai).

Next, an identification method in a case where multiple symbol markers 12 are used will be described.

In the arrangement shown in FIG. 11, even if multiple symbol markers 12 are used, the position of the barycenter of the square formed by joining the reference markers 11 (a1, a2, a3 and a4) is considered not to be deviated, to a large extent, from that of a barycenter of a polygon formed by joining the above reference markers 11 and the multiple symbol markers 12 (ai1, ai2, . . . ). If the angle of the target 10 with respect to the camera 20 is within a practical range, the reference marker 11 (a0) is considered to be located at a position closest to the barycenter of the polygon (a1a2a3a4ai . . . ).

In this case, first, a barycenter of a polygon formed by joining all the marker images excluding one is obtained. Then, an examination is made whether any marker image is located near the obtained barycenter (within a certain distance). If such a marker image is found, the chosen marker images are the marker images of the reference markers 11 (a1, a2, a3 and a4) located at the vertices of the square and the symbol markers 12 (ai). Here, the marker image located near the barycenter of the polygon (i.e. the marker image that is not chosen) is the marker image of the reference marker 11 (a0) located at the barycenter of the square.

Subsequently, a pair of marker images having a symmetric positional relationship with respect to the marker image of the reference marker 11 (a0) is extracted. Since the reference marker 11 (a0) is at the barycenter of the square formed by joining the reference markers 11 (a1, a2, a3 and a4), the marker images of the reference markers 11 (a1, a2, a3 and a4) are supposed to satisfy this condition. The marker images of any of the symbol markers 12 (ai), on the other hand, are not located at positions that have a symmetric positional relationship with respect to the marker image of the reference marker 11 (a0). Accordingly, two pairs of the marker images are to be extracted as those satisfying the condition. Consequently, the four marker images forming the two pairs are identified as the marker images of the reference markers 11 (a1, a2, a3 and a4), while the rest of the marker images are identified as the marker images of the symbol markers 12 (ai).

Figure 12:
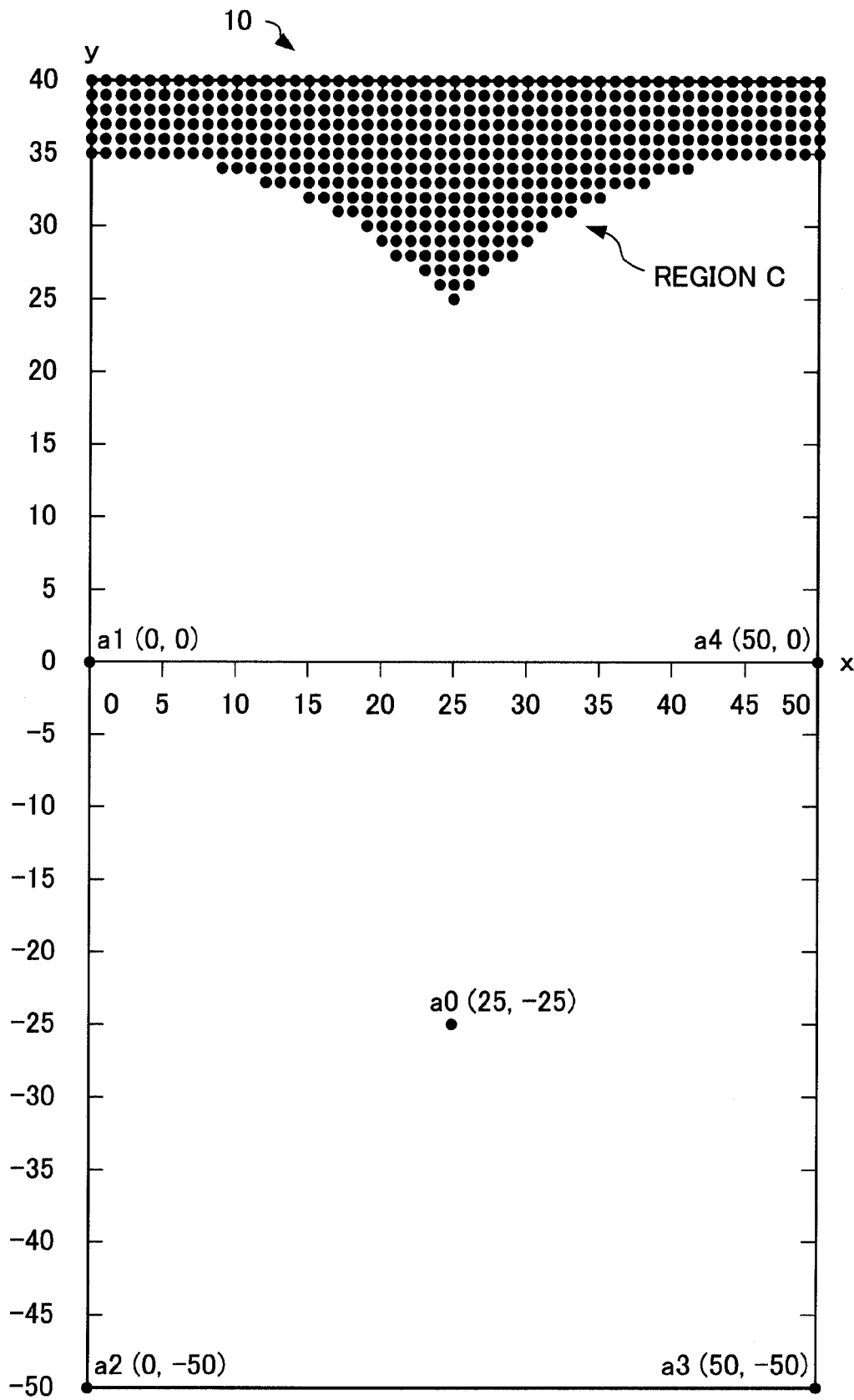
FIG. 12 is a graph showing a concrete arrangement example of the markers on the target in a case where a single symbol marker is provided, in the fifth arrangement example shown in FIG. 11.
Figure 13:
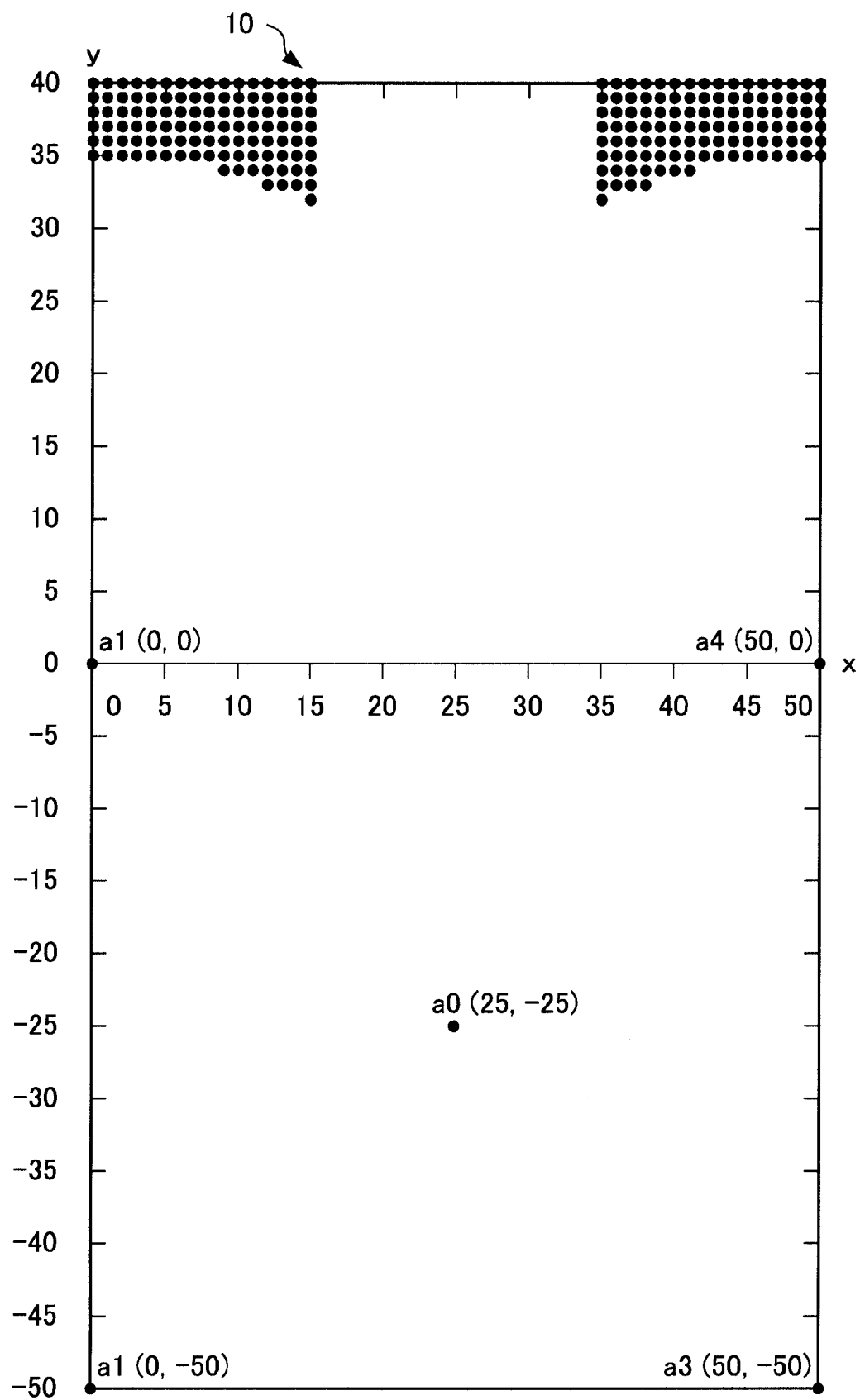
FIG. 13 is a graph showing a concrete arrangement example of the markers on the target in a case where two single symbol markers are provided, in the fifth arrangement example shown in FIG. 11.

FIG. 12 and FIG. 13 are graphs showing concrete arrangement examples of the markers 11 and 12 on the target 10 in the fifth arrangement example shown in FIG. 11. FIG. 12 shows the case in which a single symbol marker 12 is provided, and FIG. 13 shows the case in which two symbol markers 12 are provided.

In each of the examples shown in FIG. 12 and FIG. 13, a rectangle region that is 90 mm long and 50 mm wide is defined on the target 10, and the markers 11 and 12 are provided in the region. Here, a part of the region that is 70 mm long from the top side is shown in each of FIG. 12 and FIG. 13. As in the examples shown in FIG. 9 and FIG. 10, this region is for the markers 11 and 12 to be arranged therein, and is not intended to restrict the shape of the target 10 itself. In addition, also as in the examples shown in FIG. 9 and FIG. 10, orthogonal coordinates (x-y coordinates) are provided in the region with scales indicating horizontal direction (x direction) positions and vertical direction (y direction) positions. Moreover, the markers 11 and 12 are determined to be located in millimeters, and are arranged in this region accordingly.

In the example shown in FIG. 12, the reference markers 11 are provided at the following positions.

$a1: (x, y)=(0, 0)$ $a2: (x, y)=(0, -50)$ $a3: (x, y)=(50, -50)$ $a4: (x, y)=(50, 0)$ $a0: (x, y)=(25, -25)$

Among these, the four reference markers 11 (a1, a2, a3 and a4) form a square 50 mm on a side. This square is formed so that three sides a1-a2, a2-a3 and a3-a4 would be aligned respectively with sides of the region defined on the target 10.

Here, as described above with reference to FIG. 11, the symbol marker 12 is provided at a position that does not correspond to any of the vertices (a1, a2, a3 and a4) of the square and that does not form any parallelogram in combination with any three reference markers 11. In addition, since the distance between the reference marker 11 (a0) at the barycenter position and each of the reference markers 11 (a1, a2, a3 and a4) at each of the vertices is approximately 35 mm, the distance between the symbol marker 12 and each of the reference markers 11 (a0, a1, a2, a3 and a4) is also set at equal to or larger than 35 mm. In FIG. 12, a region (region C) that satisfies these conditions (that is, a region in which the symbol marker 12 is allowed to be provided) is shown. Assume that a distinguishable pitch is 1 mm in this region. This allows the symbol marker 12 to be arranged in 446 different ways.

On the other hand, in the example shown in FIG. 13, the reference markers 11 are provided in the similar manner as those in FIG. 12, and each of the two symbol markers 12 is also provided in the similar manner as that in FIG. 12. In FIG. 13, however, the symbol markers 12 are provided so that the distance between the symbol markers 12 would also be a certain length (35 mm or longer). This arrangement allows the two symbol markers 12 in combination to be arranged in 5364 different ways.

Figure 14:
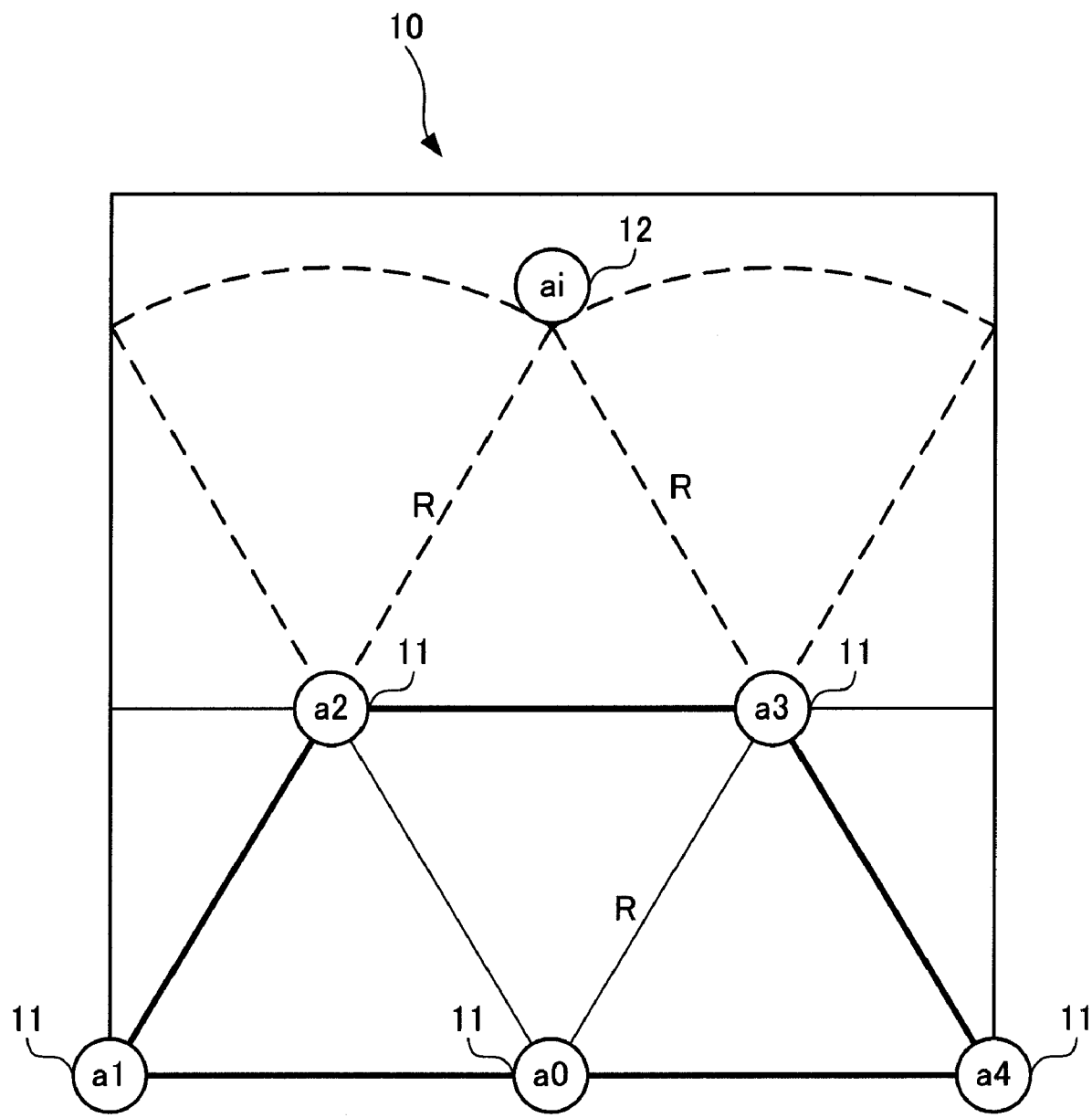
FIG. 14 is a diagram showing a sixth arrangement example of the reference markers and the symbol marker.

FIG. 14 is a diagram showing a sixth arrangement example of the reference markers 11 and the symbol marker 12.

In the example shown in FIG. 14, four out of five reference markers 11 are provided respectively at four adjacent vertices of a regular hexagon, and the remaining reference marker is provided at the barycenter of the regular hexagon. Thus, three continuous sides of the regular hexagon are formed by joining the four reference markers 11 provided at the vertices of the regular hexagon. The symbol marker 12 is provided at a position that is opposite to the barycenter of the hexagon with respect to the middle side among the three sides, and that is at a distance, larger than the length of a side of the regular hexagon, from each of the vertices at both ends of the middle side.

In this arrangement, among the reference markers 11 (a1, a2, a3 and a4) provided at the four vertices forming the three continuous sides of the regular hexagon, the middle point of a line segment a1-a4 joining the reference markers 11 (a1 and a4) at both ends of the three continuous sides corresponds to the barycenter of the regular hexagon. In other words, the line segment a1-a4 is equally divided into two by the reference marker 11 (a0) at the barycenter of the regular hexagon. A division ratio of a line segment is a feature preserved before and after an affine transformation. Compared to the symbol marker 12 (ai), the reference markers 11 (a2 and a3) are located at positions that are closer to the line segment a1-a4. Moreover, a side a2-a3 of the regular hexagon is parallel to the line segment a1-a4, and is half as long as the line segment a1-a4. On the basis of these geometric features, each marker image is identified as the marker image of either the reference marker 11 or the symbol marker 12.

Specifically, first, three marker images arranged on a line are extracted from the six marker images. In FIG. 14, three marker images arranged on a line are of the reference markers 11 (a1, a0 and a4). However, the symbol marker 12 (ai) may also be located on a line joining the reference markers 11 (a1 and a2) or a line joining the reference markers 11 (a3 and a4), marker images to be extracted may not be one set. For this reason, an examination is then made whether or not the three extracted marker images are arranged on a line at regular intervals.

As described above, since the reference marker 11 (a0) divides the line segment a1-a4 joining the reference markers 11 (a1 and a4) equally into two, a line segment a1-a0 and a line segment a0-a4 are equal in length. By contrast, in the case where the symbol marker 12 (ai) is arranged on the line joining the reference markers 11 (a1 and a2), the distance between the reference marker 11 (a2) and the symbol marker 12 (ai) is not equal to the length of the line segment a1-a2. This also applies to the case where the symbol marker 12 (ai) is arranged on the line joining the reference markers 11 (a3 and a4). This is because the symbol marker 12 (ai) is provided at a position that is at a distance, larger than the length of a side (for example, a1-a2) of the regular hexagon, from each of the vertices, at which the reference markers 11 (a2 and a3) are provided, of the regular hexagon, as described above. This relationship applies to all the marker images 11 and 12.

Accordingly, an examination is made whether or not the three marker images arranged on a line are provided at regular intervals. If provided at regular intervals, the three marker images are identified as the marker images of the reference markers 11 (a1, a0 and a4). Moreover, the middle one among the three marker images is the marker image of the reference marker 11 (a0). For convenience of explanation, the line segment joining the marker images of the reference markers 11 (a1, a0 and a4) is also referred to as the line segment a1-a4 hereinafter. This also applies to other line segments joining the markers 11 and 12.

Then, two marker images provided at the closest positions to the line segment a1-a4 are extracted. These two marker images are identified as the marker images of the reference markers 11 (a2 and a3) on the basis of the above condition. The remaining marker image is identified as the marker image of the symbol marker 12 (ai). Here, the line segment a2-a3 joining the marker images of the reference markers 11 (a2 and a3) is parallel to the line segment a1-a4, and is approximately half as long as the line segment a1-a4. The marker images of the reference markers 11 (a2 and a3) may also be identified by using these relationships.

In a case where multiple symbol markers 12 are provided, three symbol markers 12 may be arranged on a line at regular intervals. Even in such a case, by using the above-described relationships between the line segment a1-a4 and the line segment a2-a3 in combination, the five reference markers 11 (a1, a2, a3, a4 and a0) are highly likely to be identified correctly.

Figure 15:
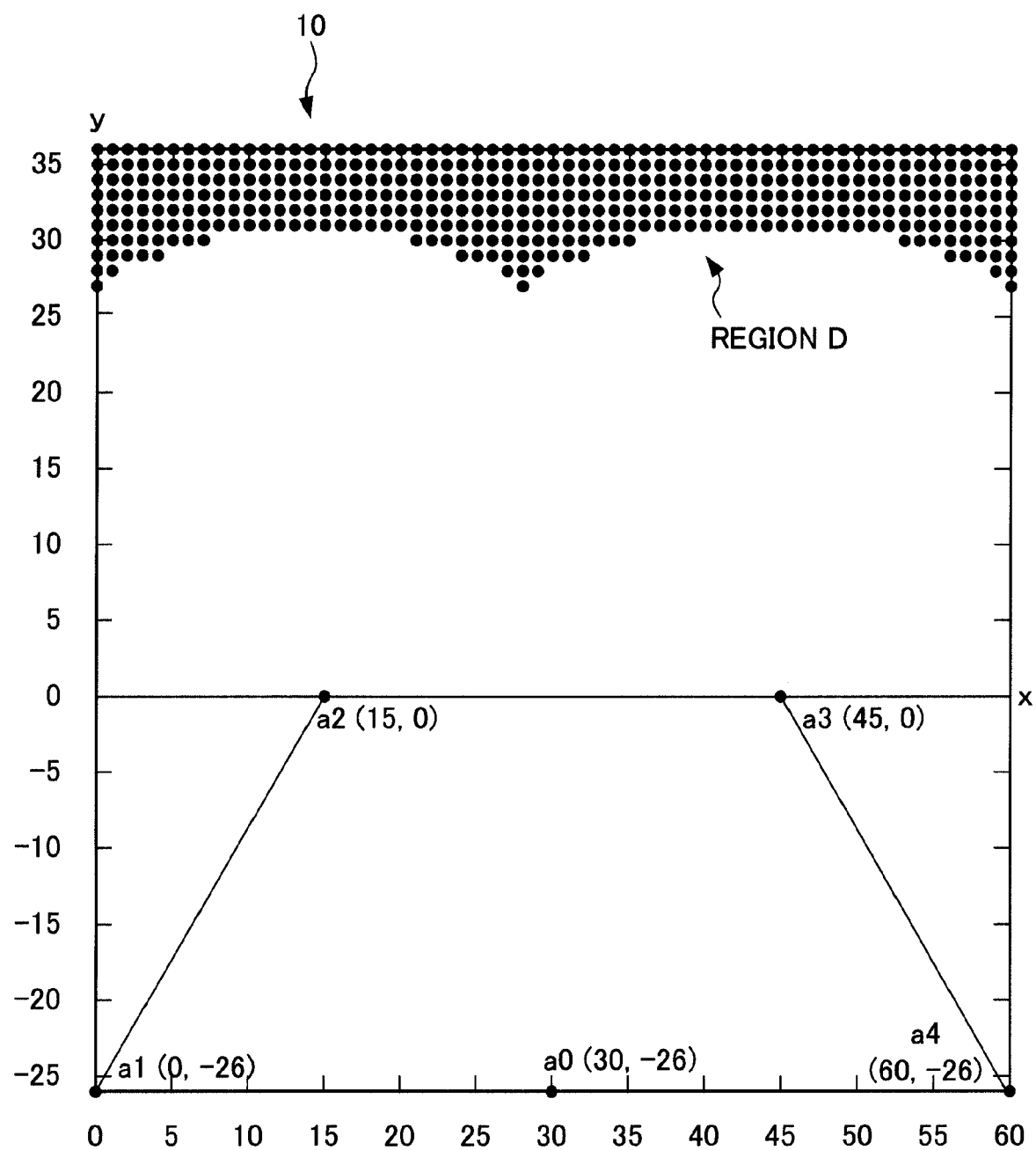
FIG. 15 is a graph showing a concrete arrangement example of the markers on the target in the sixth arrangement example shown in FIG. 14.

FIG. 15 is a graph showing a concrete arrangement example of the markers 11 and 12 on the target 10 in the sixth arrangement example shown in FIG. 14.

In the example shown in FIG. 15, a rectangle region that is 60 mm long and 62 mm wide is defined on the target 10, and the markers 11 and 12 are provided in the region. As in the examples shown in FIG. 9, FIG. 10 and the like, this region is for the markers 11 and 12 to be arranged therein, and is not intended to restrict the shape of the target 10 itself. In addition, also as in the examples shown in FIG. 9, FIG. 10 and the like, orthogonal coordinates (x-y coordinates) are provided in the region with scales indicating horizontal direction (x direction) positions and vertical direction (y direction) positions. Moreover, the markers 11 and 12 are determined to be located in millimeters, and are arranged in this region accordingly.

In the example shown in FIG. 15, the reference markers 11 are provided at the following positions.

$a1: (x, y)=(0, -26)$ $a2: (x, y)=(15, 0)$ $a3: (x, y)=(45, 0)$ $a4: (x, y)=(60, -26)$ $a0: (x, y)=(30, -26)$

Among these, the four reference markers 11 (a1, a2, a3 and a4) form a part (including continuous three sides) of a regular hexagon 30 mm on a side. This shape (trapezoid) is formed so that the side a1-a4 would be aligned with a side of the region defined on the target 10.

Here, as described above with reference to FIG. 14, the symbol marker 12 is provided at a position that is opposite to the barycenter of the regular hexagon with respect to the middle side a2-a3 among the three continuous sides a1-a2, a2-a3 and a3-a4 of the regular hexagon. In addition, the distance Ri between the symbol marker 12 and each of the reference markers 11 (a2 and a3) is larger than 30 mm (Ri>30 mm). In FIG. 15, a region (region D) that satisfies these conditions (that is, a region in which the symbol marker 12 is allowed to be provided) is shown. Assume that a distinguishable pitch is 1 mm in this region. This allows the symbol marker 12 to be arranged in 487 different ways.

Figure 16:
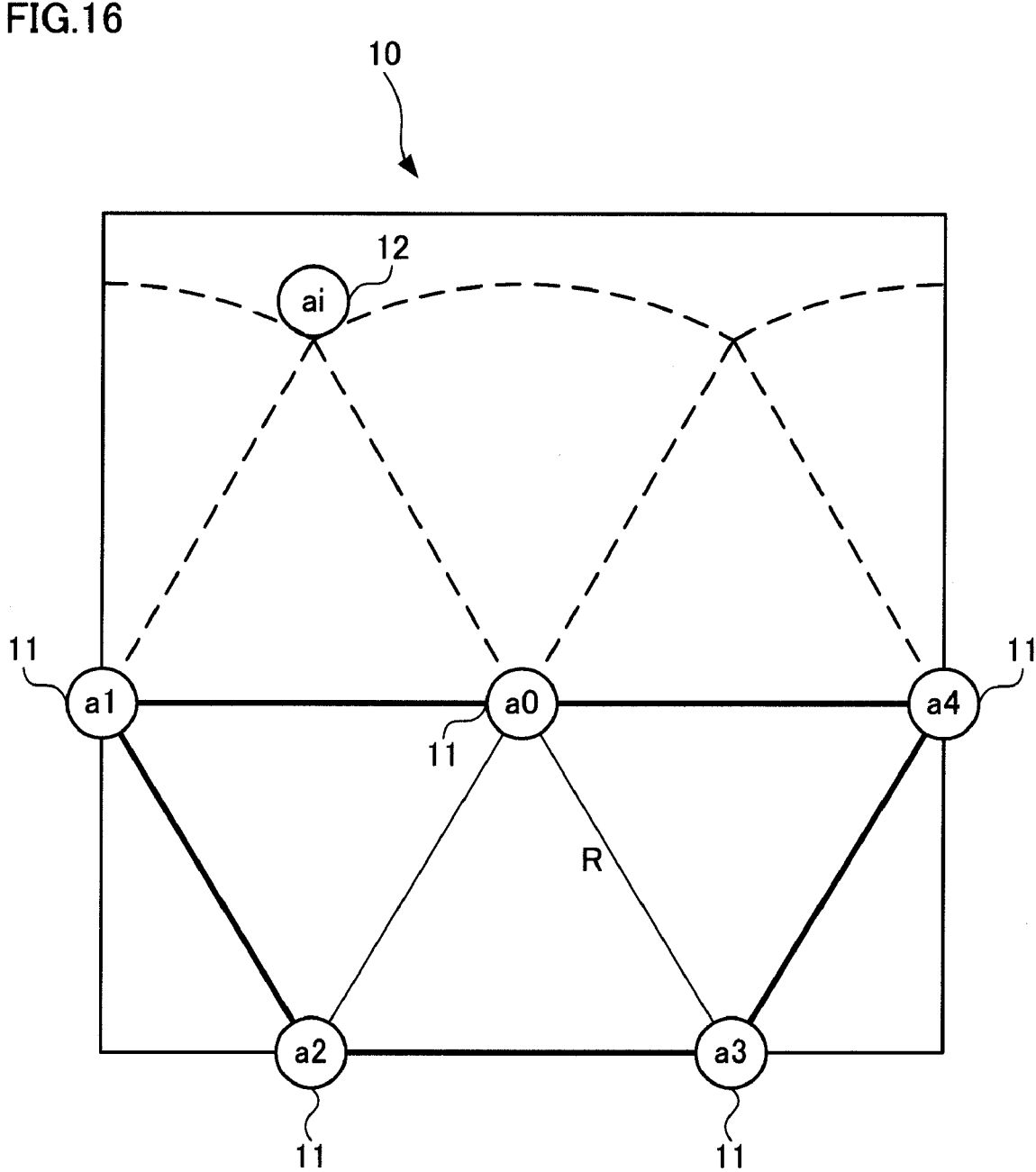
FIG. 16 is a diagram showing a seventh arrangement example of the reference markers and the symbol marker.

FIG. 16 is a diagram showing a seventh arrangement example of the reference markers 11 and the symbol marker 12.

In the example shown in FIG. 16, four out of five reference markers 11 are provided respectively at four adjacent vertices of a regular hexagon, and the remaining reference marker 11 is provided at a barycenter of the regular hexagon. Thus, three continuous sides of the regular hexagon are formed by joining the four reference markers 11 provided at the vertices of the regular hexagon. The reference markers 11 located respectively at both ends of the three continuous sides and the reference markers 11 located at the barycenter of the regular hexagon are arranged on a line at regular intervals. The symbol marker 12 is provided at a position that is opposite to the rest of the two reference markers 11 with respect to the line along which the three reference markers 11 are arranged, and that is at a distance, larger than the length of a side of the regular hexagon, from each of the three reference markers 11 arranged on the line at regular intervals.

In this arrangement, among the reference markers 11 (a1, a2, a3 and a4) provided at the four vertices forming the three continuous sides of the regular hexagon, the middle point of a line segment a1-a4 joining the reference markers 11 (a1 and a4) at both ends of the three continuous sides corresponds to the barycenter of the regular hexagon. In other words, the reference markers 11 (a1 and a4) are provided at positions that are symmetric with respect to the reference marker 11 (a0) provided at the barycenter of the regular hexagon. A barycenter of a polygon and a symmetric positional relationship with respect to the barycenter are features preserved before and after an affine transformation. In addition, the reference markers 11 (a1, a2, a3 and a4), excluding the reference marker 11 (a0) located at the barycenter of the regular hexagon, and the symbol marker 12 (ai) are placed around the reference marker 11 (a0) at the barycenter position. This is also a feature preserved before and after an affine transformation. On the basis of these geometric features, each marker image is identified as the marker image of either the reference marker 11 or the symbol marker 12.

Specifically, first, the six marker images are divided into two, that is, a single marker image and five marker images placed around the single marker image. Here, the five marker images placed around the single marker image are the marker images of the reference markers 11 (a1, a2, a3 and a4) and the symbol marker 12 (ai), and the marker image surrounded by these marker images is the marker image of the reference marker 11 (a0) located at the barycenter of the regular hexagon. Alternatively, any five marker images are chosen from the six marker images, a barycenter of a pentagon formed by joining the five chosen marker images is obtained. If a marker image provided near the obtained barycenter (within a certain distance) is found, this marker image may be identified as the marker image of the reference marker 11 (a0) In this case, the chosen five marker images are the marker images of the reference markers 11 (a1, a2, a3 and a4) and the symbol marker 12 (ai).

Subsequently, vectors a1a0, a2a0, a3a0, a4a0 and aia0 respectively from the marker images of the reference markers 11 (a1, a2, a3 and a4) and the symbol marker 12 (ai) to the marker image of the reference marker 11 (a0) are set. Thereafter, these vectors are each translated so as to have its initial point at a0, and an examination is then made whether or not any marker image is located at a terminal point of the vector after the translation. Since the reference markers 11 (a1 and a4) have a symmetric positional relationship with respect to the reference marker 11 (a0), the terminal point of the vector a1a0 after the translation by the above operation corresponds to the marker image of the reference marker 11 (a4). The terminal point of the vector a4a0 after the translation, by contrast, corresponds to the marker image of the reference marker 11 (a1). Since the rest of the marker images do not have the symmetric positional relationship with respect to the reference marker 11 (a0), no marker image is found at the terminal points of the vectors after the translation. Thus, the reference markers 11 (a0, a1 and a4) are identified.

Among the remaining three marker images, the marker images of the reference markers 11 (a2 and a3) are located on one side with respect to the line segment joining the reference markers 11 (a0, a1 and a4), while the marker image of the symbol marker 12 (ai) is located on the other side with respect to the line segment. Accordingly, two adjacent marker images among the three marker images are identified as the marker images of the reference markers 11 (a2 and a3), while the remaining marker image is identified as the marker image of the symbol marker 12 (ai).

Figure 17:
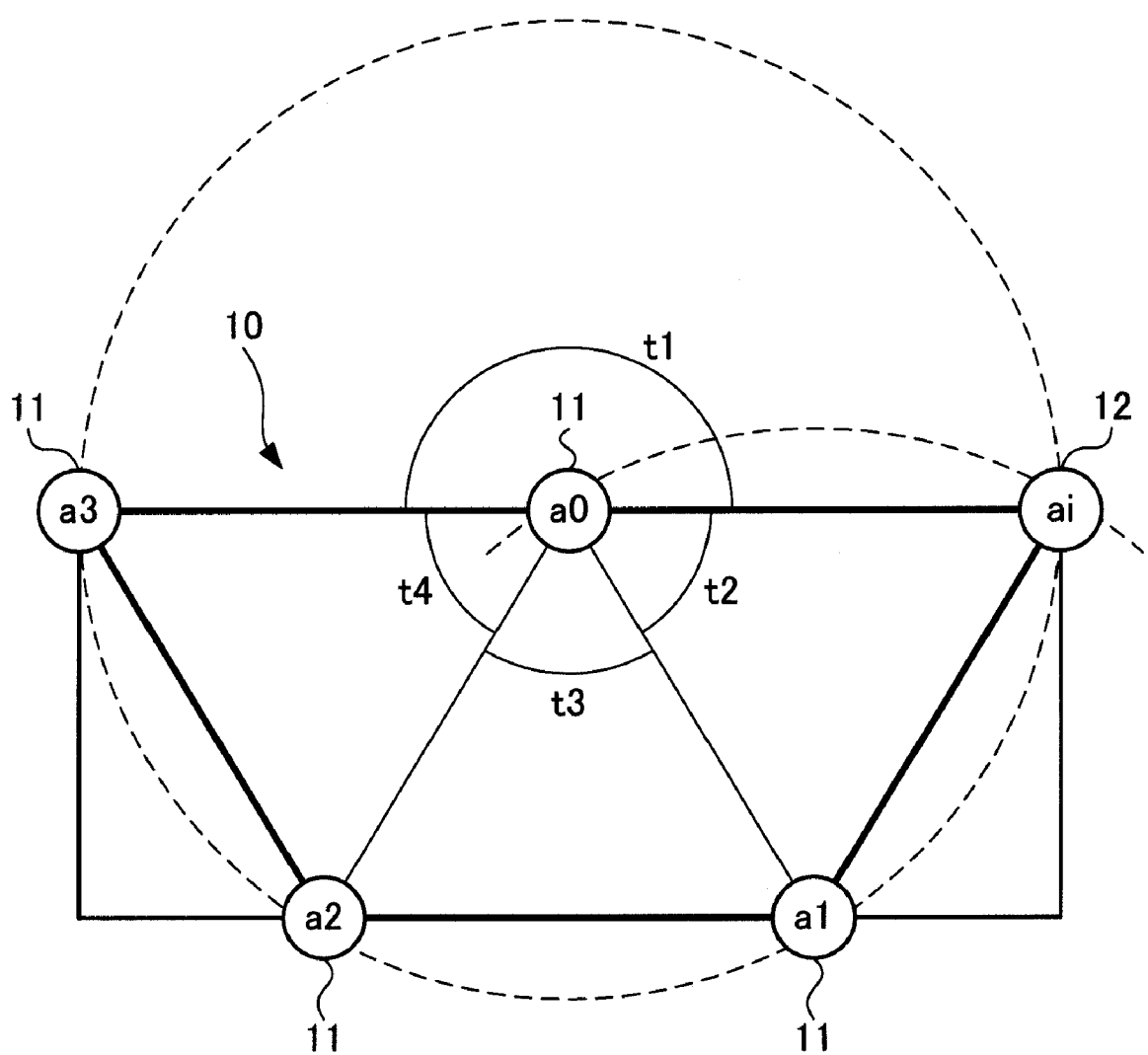
FIG. 17 is a diagram showing an eighth arrangement example of the reference markers and the symbol marker.

FIG. 17 is a diagram showing an eighth arrangement example of the reference markers 11 and the symbol marker 12.

In the example shown in FIG. 17, three out of four reference markers 11 are provided respectively at three adjacent vertices of a regular hexagon, and the remaining reference marker 11 is provided at a barycenter of the regular hexagon. Thus, two continuous sides of the regular hexagon are formed by joining the three reference markers 11 provided at the vertices of the regular hexagon. A single symbol marker 12 is provided at a position that is on or around a line joining the reference marker 11 provided at the vertex at one end of the two continuous sides of the regular hexagon and the reference marker 11 provided at the barycenter of the regular hexagon, and that is opposite to the reference marker 11 at the vertex with respect to the reference marker 11 at the barycenter position. The distance between the symbol marker 12 and the reference marker 11 at the barycenter position is larger than the length of a side of the regular hexagon.

In this arrangement, the reference marker 11 (a3) provided at a vertex of the regular hexagon, the reference marker 11 (a0) provided at the barycenter of the regular hexagon and the symbol marker 12 (ai) are roughly arranged on a line in this order. Moreover, the symbol marker 12 (ai) is located at the end of the approximately straight line segment a3-a0-ai when following, in the clockwise direction, a pentagon formed by joining the reference markers 11 (a1, a2, a3 and a0) and the symbol marker 12 (ai). These positional relationships are features preserved before and after an affine transformation. On the basis of these geometric features, each marker image is identified as the marker image of either the reference marker 11 or the symbol marker 12.

First, the three marker images roughly arranged on an approximately straight line are extracted from the five marker images. Here, the angle between two line segments joining the respective marker images at both ends of the line and the marker image in the middle of the three marker images with the middle marker image as the vertex of angle is 180° or 180°± certain degrees. In this case, the extracted three marker images are the marker images of the reference markers 11 (a3 and a0) and the symbol marker 12 (ai). The marker image in the middle is the marker image of the reference marker 11 (a0) located at the barycenter of the regular hexagon. However, at this stage, it is not yet identified which marker image between those at the ends is the marker image of the symbol marker 12 (ai).

Next, by following, in the clockwise direction, a quadrilateral formed by joining the five marker images, i.e. the above-described three marker images and the remaining two marker images, the marker image located at the end of the line segment a3-a0-ai is identified as the marker image of the symbol marker 12 (ai). In accordance with the identification, the marker image of the reference marker 11 (a3) is also identified. On the basis of the positional relationships with the reference markers 11 (a3 and a0), the marker images of the remaining two reference markers 11 (a1 and a2) are also identified. Here, although five marker images are joined, the shape formed by joining the marker images is regarded as a quadrilateral in the explanation since the line segment a3-a0-ai is an approximately straight line.

Hereinabove, the arrangement examples and the identification methods of the reference markers 11 and the symbol marker 12 have been described. However, the arrangement and the identification methods of the markers provided on the target 10 are not restricted to the above examples.

In the present exemplary embodiment, the reference markers 11 are provided at (all of or a part of) vertices of a regular polygon, or at vertices of a regular polygon and a barycenter of the regular polygon. In addition, the symbol marker 12 is provided to have certain positional relationships with the vertices and the barycenter of the regular polygon. On the basis of the geometric features or the like preserved before and after an affine transformation among the geometric features of a regular polygon, each marker image in the image captured by the camera 20 is identified as the marker image of either the reference marker 11 or the symbol marker 12. Accordingly, any arrangement of the markers 11 and 12 on the target 10 is allowed as long as the markers 11 and 12 satisfy the above-described positional relationships and are identified on the basis of the geometric features of a regular polygon.

When the markers 11 and 12 are physically provided on the target 10 in practice, it is conceivable in some cases that the relative positions of the reference markers 11 are deviated from the positions of vertices of a regular polygon, and that the shape formed by joining the reference markers 11 is accordingly not a regular polygon in a strict sense. However, as long as the deviation of the relative positions of the reference markers 11 is small and the reference markers 11 are identified by any of the above-described identification methods based on the assumption that the reference markers 11 are provided at vertices and a barycenter of a regular polygon, the arrangement of the reference markers 11 is considered to be within the technical idea of the present exemplary embodiment, and a shape formed by such an arrangement is considered as a shape called a regular polygon in the present exemplary embodiment.

A polygon, other than a triangle, is also understood as a combination of other polygons each having a smaller number of vertices. Accordingly, the arrangement of four or more reference markers 11 on the same plane described in each of the above-described arrangement examples may also be understood as combinations of multiple polygons each being either a regular polygon or any other type of polygon. For example, in the first arrangement example shown in FIG. 4, the five reference markers 11 are provided at five vertices of the regular hexagon. However, the shape formed by joining the five reference markers 11 may be understood as a combination of a trapezoid (a1a2a3a4) and a triangle (a1a4a5) Similarly, in the fourth arrangement example shown in FIG. 8, the arrangement of the four reference markers 11 may be understood as a combination of three triangles (a0a1a2), (a0a2a3) and (a0a3a1). Moreover, in some cases, the above-described arrangements of the reference markers 11 may each be understood as those forming another polygon. For example, although the four reference markers 11 are provided at the four vertices of the regular hexagon in the second arrangement example shown in FIG. 6, this arrangement may be understood as a rectangle (a1a2a3a4), instead. Thus, the shape formed as a result of such an arrangement of the reference markers 11 may be understood as various polygons. Nevertheless, as long as the reference markers 11 and the symbol marker 12 are identifiable by one of the above-described identification methods, the arrangement of the reference markers 11 should be regarded as a corresponding one of the above-described arrangements.

In addition, although luminous points formed of LEDs are used for the reference markers 11 and the symbol marker 12 in the present exemplary embodiment, the reference markers 11 and the symbol marker 12 are not restricted thereto. For example, instead of LEDs, retroreflecting plate may be provided as the reference markers 11 and the symbol marker 12. In this case, light is emitted by a lighting apparatus provided near the camera 20, and reflected light by the retroreflecting plate are captured by the camera 20.

<Calculation of Three-dimensional Position and Three-axial Angles of Target 10 in Second Example>

Next, a description will be given of a method for the calculation apparatus 30 to calculate a three-dimensional position and the three-axial angles of the target 10 on the basis of the positions of the reference markers 11 in the second example where three or more reference markers 11 are provided on the same plane and one reference marker 11 is provided at a certain height from the plane. In the following description, the reference markers 11 and the symbol marker 12 are assumed to be already identified. An identification method of the markers 11 and 12 will be described later. In addition, the three reference markers 11 are assumed to be provided on the same plane to form a triangle.

In the second example, if discrimination between the three reference markers 11 located on the same plane and the single reference marker 11 located at a certain height from the plane is necessary, the former reference markers 11 are called first reference markers 11a, 11b and 11c by adding symbols a to c, while the latter reference marker 11 is called a second reference marker 11d by adding a symbol d. The first reference markers 11a, 11b and 11c are provided on a surface of the target 10. The second reference marker 11d is provided at an end of a leg provided near a barycenter of the triangle formed by joining the first reference markers 11a, 11b and 11c.

The leg at an end of which the second reference marker 11d is provided may be any length under one condition. The condition is that, even if the target 10 is inclined with respect to the image capturing surface of the camera 20, the marker image of the second reference marker 11d (i.e. the image of the marker captured by the camera 20, the same applies to the other markers hereinafter) is maintained to be located in a position closest, among those of the reference markers 11a, 11b, 11c and 11d, to the barycenter of the triangle formed by joining the marker images of the first reference markers 11a, 11b and 11c. Thus, the length of the leg may be determined in practical use according to the estimation of how much the target 10 may be inclined with respect to the image capturing surface of the camera 20.

Moreover, although the position of the leg at an end of which the second reference marker 11d is provided is set near the barycenter of the triangle formed by joining the first reference markers 11a, 11b and 11c in the above description, the position is not necessarily restricted thereto. In practice, the marker image of the second reference marker lid may be provided at any position, as long as the position is closest to the barycenter of the triangle formed by joining the marker images of the first reference markers 11a, 11b and 11c, among the marker images of the reference markers 11a, 11b, 11c and 11d, even if the target 10 is inclined with respect to the image capturing surface of the camera 20. It is necessary to take into account the relationship between the position of the marker image of the second reference marker 11d and the length of the leg at an end of which the second reference marker 11d is provided in a strict sense. However, in a case where the leg is short, the marker image of the second reference marker 11d does not move to a large extent even if the target 10 is inclined with respect to the image capturing surface of the camera 20. Accordingly, in practice, the second reference marker 11d only needs to be provided at a position closest to the barycenter of the triangle formed by joining the first reference markers 11a, 11b and 11c, among the reference markers 11a, 11b, 11c and 11d.

Figure 18:
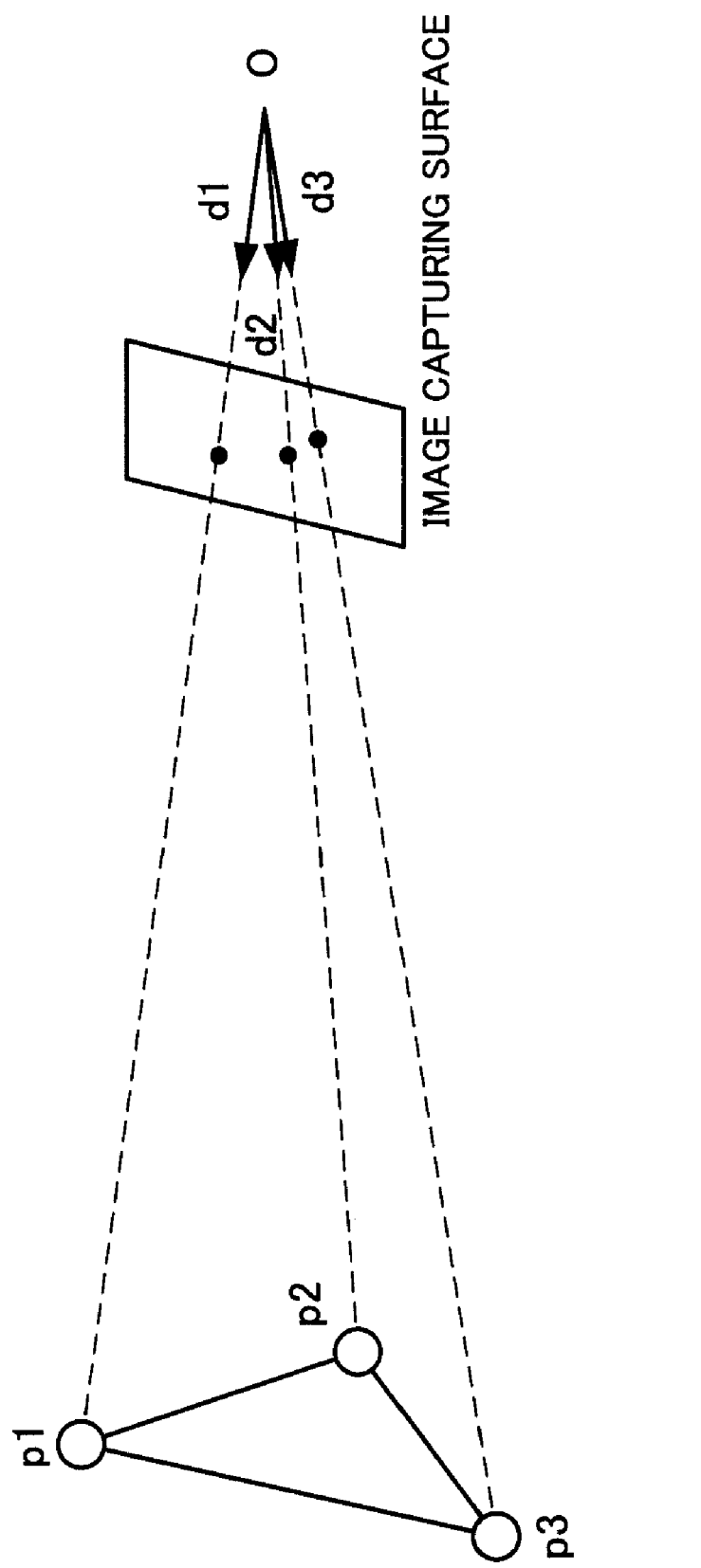
FIG. 18 is a diagram for explaining a method of calculating the three-dimensional position and the three-axial angles of a target.

FIG. 18 is a diagram for explaining a method of calculating the three-dimensional position and the three-axial angles of the target 10.

An image captured by the camera 20 is a perspective projection model. First, as shown in FIG. 18, directions di (i=1, 2, 3), which extend from the optical center O of the camera 20 to the respective first reference markers 11a, 11b and 11c, are calculated on the basis of the marker images of the first reference markers 11a, 11b and 11c on an image captured by the camera 20 (i.e. on the image sensor 22). Each direction di is on the line joining the optical center O and the marker image of the corresponding one of the first reference markers 11a, 11b and 11c on the image capturing surface of the camera 20, and is a normalized unit vector having the optical center O as the initial point. Here, the direction to the first reference marker 11a is denoted by a vector d1 (=[x1, y1, z1]), the direction to the first reference marker 11b is denoted by a vector d2 (=[x2, y2, z2]), and the direction to the first reference marker 11c is denoted by a vector d3 (=[x3, y3, z3]).

A position vector of the first reference marker 11a is denoted by p1, a position vector of the first reference marker 11b is denoted by p2, and a position vector of the first reference marker 11c is denoted by p3, which have the optical center O of the camera 20 as the basic point. Each position vector pi overlaps with the above-described vector di. Accordingly, with coefficients t1, t2 and t3 respectively representing the lengths of the position vectors pi, the position vectors pi are expressed as follows.

$$p1 = t1 \cdot d1$$

$$p2 = t2 \cdot d2$$

$$p3 = t3 \cdot d3 \qquad \text{[Expressions 6]}$$

Since the shape of the triangle formed by joining the first reference markers 11a, 11b and 11c is already known, the following expressions are obtained if the lengths of the sides of the triangle (i.e. the lengths between the first reference markers 11a, 11b and 11c) are denoted by p1p2=L1, p2p3=L2 and p3p1=L3.

$$(t1x1 - t2x2)^2 + (t1y1 - t2y2)^2 + (t1z1 - t2z2)^2 = L1^2$$

$$(t2x2 - t3x3)^2 + (t2y2 - t3y3)^2 + (t2z2 - t3z3)^2 = L2^2$$

$$(t3x3 - t1x1)^2 + (t3y3 - t1y1)^2 + (t3z3 - t1z1)^2 = L3^2 \qquad \text{[Expressions 7]}$$

The above expressions are simplified as follows.

$$t1^2 - 2t1t2(x1x2+y1y2+z1z2) + t2^2 - L1^2 = 0$$

$$t2^2 - 2t2t3(x2x3+y2y3+z2z3) + t3^2 - L2^2 = 0$$

$$t3^2 - 2t3t1(x3x1+y3y1+z3z1) + t1^2 - L3^2 = 0 \quad \text{[Expressions 8]}$$

Further, the following expressions are obtained, $$t1 = A1 \cdot t2 \pm \sqrt{(A1^2-1) \cdot t2^2 + L1^2}$$

$$t2 = A2 \cdot t3 \pm \sqrt{(A2^2-1) \cdot t3^2 + L2^2}$$

$$t3 = A3 \cdot t1 \pm \sqrt{(A3^2-1) \cdot t1^2 + L3^2} \quad \text{[Expressions 9]}$$

where $$A1 = x1x2+y1y2+z1z2$$

$$A2 = x2x3+y2y3+z2z3$$

$$A3 = x3x1+y3y1+z3z1.$$

In order to have real roots, the real numbers t1, t2 and t3 that satisfy the conditions of the following expressions are each substituted into the above-described Expression 4, and all of the coefficients t1, t2 and t3 with which Expressions 9 hold are obtained.

$$t1 \leq \sqrt{\frac{L3^2}{1-A3^2}} \quad \text{[Expressions 10]}$$

$$t2 \leq \sqrt{\frac{L1^2}{1-A1^2}}$$

$$t3 \leq \sqrt{\frac{L2^2}{1-A2^2}}$$

Generally, multiple combinations of the coefficients t1, t2 and t3 with which Expressions 9 hold are found. On the basis of the position of the second reference marker 11d, a certain combination of the coefficients t1, t2 and t3 is chosen from the multiple combinations of the coefficients t1, t2 and t3 (candidates).

Specifically, first, the combination of the position vectors p1, p2 and p3 corresponding to each of all the calculated combinations of the coefficients t1, t2 and t3 is calculated, and the three-dimensional position and the three-axial angles of a triangle formed by the combination of the position vectors p1, p2 and p3 are obtained. Then, the position of the second reference marker 11d with respect to each of the triangles is calculated on the basis of the three-dimensional position and the three-axial angles of the triangle, and is denoted by a position vector p4. Thereafter, the position on the image, of the point of the position vector p4 to be captured by the camera 20 (image position) is calculated, and a comparison is made between each of the calculated values and the image position of the second reference marker 11d actually captured by the camera 20. As a result, the triangle that corresponds to the position vector p4 which has the smallest difference from the actual image position is extracted, and the combination of the coefficients t1, t2 and t3 corresponding to the extracted triangle is chosen as the correct solution.

In this way, the directions d1, d2 and d3 and the distances t1, t2 and t3 from the optical center O to the first reference markers 11a, 11b and 11c are obtained. On the basis of this information, the three-dimensional position and the three-axial angles of the triangle formed by joining the first reference markers 11a, 11b and 11c (and the target 10 including the triangle) are obtained.

The method of calculating the three-dimensional position and the three-axial angles of the target 10 using the reference markers 11a, 11b, 11c and 11d is not restricted to the above-described procedure. For example, in the above-described procedure, multiple combinations of the coefficients t1, t2 and t3 are obtained first, and one correct solution is then extracted from the multiple combinations on the basis of the image position of the second reference marker 11d. However, the distances t1, t2, t3 and t4 to the respective reference markers 11a, 11b, 11c and 11d may be obtained in consideration of the relationships between the image position of the second reference marker 11d and the image positions of the first reference markers 11a, 11b and 11c from the beginning.

<Marker Identification based on Images in Second Example>

Next, a description will be given of a method for the calculation apparatus 30 to identify each of the marker images of the reference markers 11 and the symbol marker 12 on the basis of an image captured by the camera 20 in the second example where the three first reference markers 11a, 11b and 11c are provided on the same plane and the single second reference marker 11d is provided at a certain height from the plane.

Figures 19A, 19B:
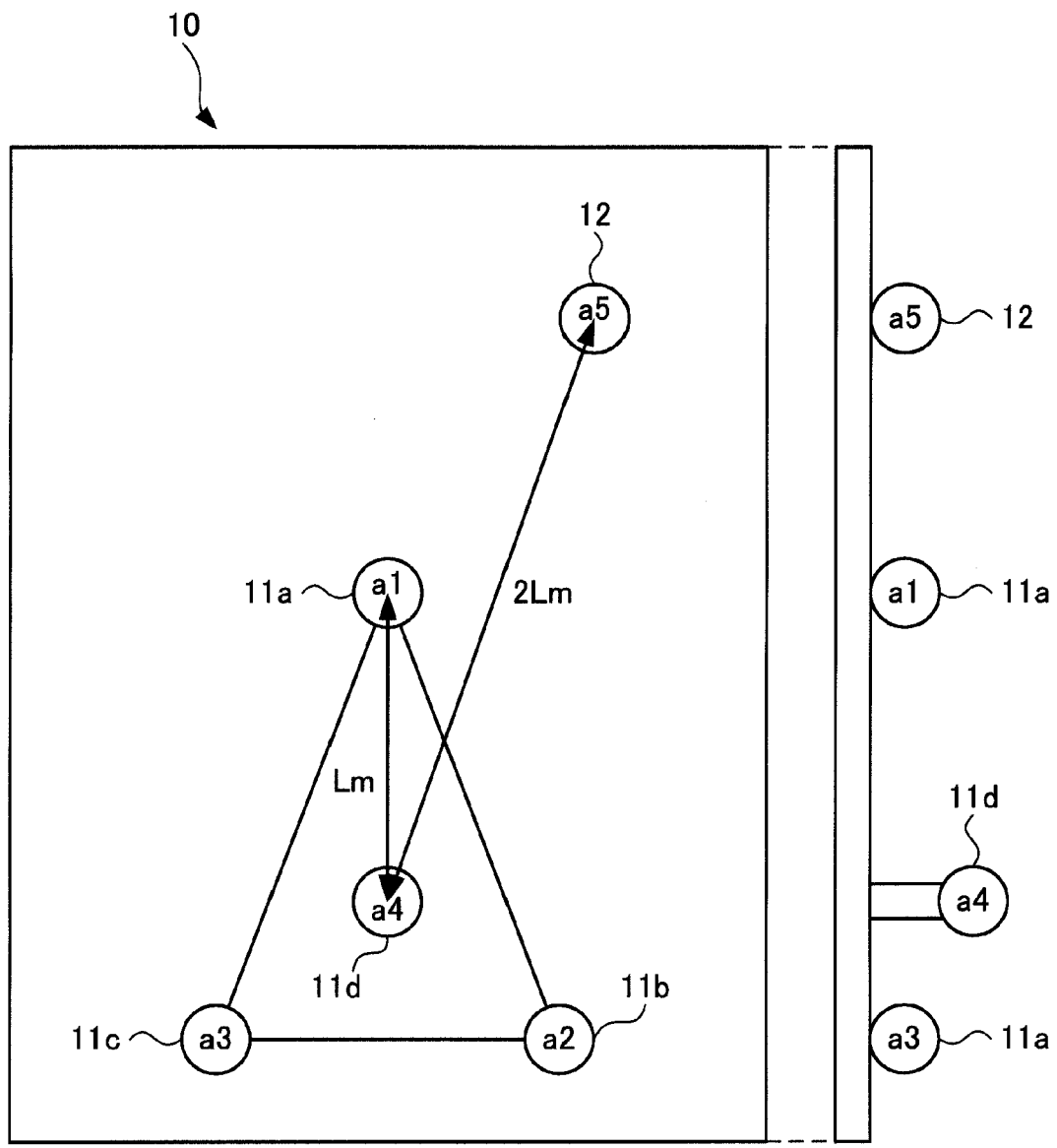
FIGS. 19A and 19B are views showing a ninth arrangement example of the reference markers and the symbol marker.

FIGS. 19A and 19B are diagrams showing the ninth arrangement example of the reference markers 11 and the symbol marker 12. This arrangement example is an example of arrangement according to the second example. FIG. 19A is a diagram showing the plane on which the first reference markers 11a, 11b and 11c are provided, seen from a direction vertical to the plane, and FIG. 19B is a diagram showing the plane seen from a direction parallel to the plane.

In the example shown in FIGS. 19A and 19B, the second reference marker 11d is provided at a barycenter (a0) of a triangle (a1a2a3) formed by joining the first reference markers 11a, 11b and 11c. The barycenter position of a triangle is a geometric feature preserved before and after an affine transformation. Specifically, when the triangle formed by joining the first reference markers 11a, 11b and 11c provided on the target 10 is transformed by an affine transformation, the barycenter position of the original triangle corresponds to the barycenter position of the triangle after the transformation. Here, the triangle (a1a2a3) does not need to be any special triangle such as a regular triangle or an isosceles triangle, but may be arbitrary triangle. The second reference marker 11d is provided at a position having a certain height from the plane on which the first reference markers 11a, 11b and 11c are provided (see FIG. 19B). Assume that the distance between the barycenter (a0) and the vertex that is located farthest from the barycenter (a0) among the three vertices of the triangle (a1a2a3) is Lm. Then, the symbol marker 12 is provided at a position where the distance from the symbol marker 12 to the barycenter (a0) is equal to or larger than 2 Lm.

The positional relationships between the reference markers 11 themselves and between the symbol marker 12 and the reference markers 11 are used to identify the marker images of the reference markers 11 and the symbol marker 12 on the basis of an image captured by the camera 20. For example, among the reference markers 11a, 11b, 11c and 11d, the second reference marker 11d is located at a position closest to the barycenter of the triangle (a1a2a3), and is hence considered to be located at a position closest to a barycenter position of a quadrilateral (a1a2a3a4) formed by joining the vertices of the triangle (a1a2a3) and the symbol marker 12 (a4). Given this factor, for each of all the combinations of four marker images among the five marker images, the barycenter position of the quadrilateral formed by joining the four marker images is calculated, and a comparison is made between the calculated position and the position of the remaining marker image. Then, the marker image having the shortest distance to the calculated barycenter position is chosen, and the chosen marker image is identified as the marker image of the second reference marker 11d. Thereafter, the marker image having the longest distance to the calculated barycenter position is chosen, and the chosen marker image is identified as the marker image of the symbol marker 12. Lastly, on the basis of the positional relationships with the marker images of the second reference marker 11d and the symbol marker 12, the three remaining marker images are identified as the first reference markers 11a, 11b and 11c.

When the positions of the markers 11 and 12 are calculated, the positional relationships between the symbol marker 12 and each of the reference markers 11 is obtained. On the basis of the positional relationships, certain information (such as an ID number) may be read. Here, if the symbol marker 12 is provided on the same plane as the first reference markers 11a, 11b and 11c as described above, the position of the symbol marker 12 is directly identified on the basis of the marker image of the symbol marker 12 to read information. Even if the symbol marker 12 is not provided on the same plane as the first reference markers 11a, 11b and 11c, the intersection position of the plane and the perpendicular line from the symbol marker 12 to the plane is calculated by using the height from the plane to the symbol marker 12, and information is read on the basis of the calculated position.

In the ninth arrangement example, the description has been given of the case in which the three first reference markers 11a, 11b and 11c form a triangle. However, each of the reference markers 11 and 12 may be identified by the same procedure even in a case where four or more first reference markers are provided. Specifically, irrespective of the number of the first reference markers 11, the second reference marker 11 is provided near the barycenter of the polygon formed by joining the first reference markers 11, and the symbol marker 12 is provided at the position farthest from the barycenter of the polygon. Accordingly, as in the above-described case, first, a polygon formed by joining the first reference markers 11 is found. Thereafter, the marker images located respectively at a position closest to and a position farthest from the barycenter of the polygon are found, and are then identified as the marker images of the second reference marker 11 and the symbol marker 12, respectively. Subsequently, the other marker images forming the polygon are individually identified as the marker images of the first reference markers 11.

In the ninth arrangement example, the distance between the symbol marker 12 and the barycenter of the polygon formed by joining the first reference markers 11 is set to be equal to or larger than a length twice as long as the longest distance between the first reference markers 11 and the second reference marker 11. However, if the target 10 is not inclined with respect to the camera 20 to a large extent, the ratio between the distances from the barycenter of the polygon formed by joining the first reference markers 11 to the marker images of the first reference markers 11 and the symbol marker 12 are considered not to change to a large extent even in an image captured by the camera 20. Accordingly, depending on objects implementing the present exemplary embodiment, the distance between the symbol marker 12 and the barycenter of the polygon formed by joining the first reference markers 11 only needs to be longer than the longest distance between the first reference markers 11 and the second reference marker 11, and does not need to be equal to or larger than the length twice as long as the longest distance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A position measuring system comprising:
    an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;
    an identification unit that identifies images of the first reference points and the second reference point captured by the image capturing unit, on the basis of positional relationships between the images of the first reference points and the second reference point; and
    a calculation unit that calculates a three-dimensional position and three-axial angles of the object on the basis of positional relationships of the images of the first reference points identified by the identification unit,
    wherein the second reference point to be captured by the image capturing unit is provided at a position having a distance, from each vertex of a polygon formed by joining the first reference points, longer than a distance between a barycenter and each vertex of the polygon, and
    the identification unit identifies, as an image of the second reference point, an image located farthest from a barycenter of a polygon formed by joining the images of the first reference points and the second reference point thus captured, and identifies the other images as the images of the first reference points.

2. The position measuring system according to claim 1, wherein the first reference points to be captured by the image capturing unit are provided respectively at vertices of a regular polygon.

3. The position measuring system according to claim 1, wherein one of the first reference points to be captured by the image capturing unit is provided at a barycenter of a polygon formed by joining the other first reference points, and at a certain height from a plane on which the polygon is formed.

4. A position measuring system comprising:
    an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;
    an identification unit that identifies images of the first reference points and the second reference point captured by the image capturing unit, on a basis of positional relationships between the images of the first reference points and the second reference point; and
    a calculation unit that calculates a three-dimensional position and three-axial angles of the object on the basis of positional relationships of the images of the first reference points identified by the identification unit, wherein the first reference points to be captured by the image capturing unit are provided respectively at four vertices included in vertices of a regular polygon, the number of the vertices of the regular polygon being even, the four vertices composed of two pairs of vertices having a symmetric positional relationship with respect to a barycenter of the regular polygon, the second reference point to be captured by the image capturing unit is provided at a position that does not correspond to any of the vertices of the regular polygon and that does not form any parallelogram in combination with any three of the first reference points, and the identification unit chooses any four images from the images of the first reference points and the second reference point thus captured, calculates a barycenter of a quadrilateral formed by joining the four images, and identifies the four images as the images of the first reference points and identifies the other image as an image of the second reference point, if the four images are composed of two pairs of images symmetrically located with respect to the barycenter of the quadrilateral.

5. The position measuring system according to claim 4, further comprising a reading unit that reads information indicated by an arrangement of the second reference point, from an image of the second reference point identified by the identification unit.

6. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on a basis of positional relationships between the images of the first reference points and the second reference point; and a calculation unit that calculates a three-dimensional position and three-axial angles of the object on the basis of positional relationships of the images of the first reference points identified by the identification unit, wherein the first reference points to be captured by the image capturing unit are provided respectively at four vertices included in vertices of a regular polygon, the number of the vertices of the regular polygon being even, the four vertices composed of two pairs of vertices having a symmetric positional relationship with respect to a barycenter of the regular polygon, the second reference point to be captured by the image capturing unit is provided at a position that does not correspond to any of the vertices of the regular polygon and that does not form any parallelogram in combination with any three of the first reference points, and the identification unit chooses any four images from the images of the first reference points and the second reference point thus captured, calculates a barycenter of a quadrilateral formed by joining the four images, and identifies the four images as the images of the first reference points and identifies the other image as an image of the second reference point, if a position of an intersection of diagonal lines of the quadrilateral formed by joining the four images corresponds to a position of the barycenter of the quadrilateral.

7. The position measuring system according to claim 6, further comprising a reading unit that reads information indicated by an arrangement of the second reference point, from an image of the second reference point identified by the identification unit.

8. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit, wherein the first reference points to be captured by the image capturing unit are provided respectively at vertices and a barycenter of a regular polygon, the second reference point to be captured by the image capturing unit is provided at a position that dos not correspond to any of the vertices of the regular polygon, the position having a distance, from each of the vertices and the barycenter of the regular polygon, equal to or larger than a distance between the barycenter and each of the vertices of the regular polygon, and the identification unit identifies, as an image of one of the first reference points provided at the barycenter of the regular polygon, an image located at a position closest to a barycenter of a polygon formed by joining the images of the first reference points and the second reference point thus captured, obtains for each of the other images, angles each formed between two images adjacent to each of the other images with the one of the first reference points provided at the barycenter as an vertex of angle, identifies an image having a smallest angle thus obtained as an image of the second reference point, and identifies rest of the images as the images of the other first reference points provided at the vertices of the regular polygon.

9. The position measuring system according to claim 8, further comprising a reading unit that reads information indicated by an arrangement of the second reference point, from an image of the second reference point identified by the identification unit.

10. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit, wherein the first reference points to be captured by the image capturing unit are provided respectively at vertices and a barycenter of a regular polygon, the second reference point to be captured by the image capturing unit is provided at a position that does not correspond to any of the vertices of the regular polygon, the position having a distance, from each of the vertices and the barycenter of the regular polygon, equal to or larger than a distance between the barycenter and each of the vertices of the regular polygon, and the identification unit chooses any images from the images of the first reference points and the second reference point thus captured, the number of the images thus chosen being the same as the number of the vertices of the regular polygon, calculates a barycenter of a polygon formed by joining the images thus chosen, and identifies, if an image is found within a certain distance from the barycenter of the polygon, the image thus found and the images forming the polygon as the images of the first reference points provided at the barycenter and the vertices of the regular polygon, and the other image as an image of the second reference point.

11. The position measuring system according to claim 10, further comprising a reading unit that reads information indicated by an arrangement of the second reference point, from an image of the second reference point identified by the identification unit.

12. A position measuring system comprising:
an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;
an identification unit that identifies images of the first reference points and the second reference point captured by the image capturing unit, on a basis of positional relationships between the images of the first reference points and the second reference point; and
a calculation unit that calculates a three-dimensional position and three-axial angles of the object on the basis of positional relationships of the images of the first reference points identified by the identification unit, wherein
the first reference points to be captured by the image capturing unit are provided respectively at vertices and a barycenter of a square,
the second reference point to be captured by the image capturing unit is provided at a position that does not correspond to any of the vertices of the square and that does not form any parallelogram in combination with any three of the first reference points, and
the identification unit identifies, as an image of one of the first reference points provided at the barycenter of the square, an image located at a position closest to a barycenter of a quadrilateral formed by joining the images of the first reference points and the second reference point thus captured, for each of the other images, obtains angles each formed between two images adjacent to each of the other images with the one of the first reference points provided at the barycenter as an vertex of angle, identifies an image having a smallest angle thus obtained, as an image of the second reference point, and identifies rest of the images as the images of the other first reference points provided at the vertices of the square.

13. The position measuring system according to claim 12, further comprising a reading unit that reads information indicated by an arrangement of the second reference point, from an image of the second reference point identified by the identification unit.

14. A position measuring system comprising:
an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;
an identification unit that identifies images of the first reference points and the second reference point captured by the image capturing unit, on the basis of positional relationships between the images of the first reference points and the second reference point; and
a calculation unit that calculates a three-dimensional position and three-axial angles of the object on the basis of positional relationships of the images of the first reference points identified by the identification unit, wherein
the first reference points to be captured by the image capturing unit are provided respectively at vertices and a barycenter of a square,
the second reference point to be captured by the image capturing unit is provided at a position that does not correspond to any of the vertices of the square and that does not form any parallelogram in combination with any three of the first reference points, and
the identification unit chooses any four images from the images of the first reference points and the second reference point thus captured, calculates a barycenter of a quadrilateral formed by joining the four images thus chosen, and identifies, if an image is found within a certain distance from the barycenter of the quadrilateral, the image thus found and the images forming the quadrilateral as the images of the first reference points provided at the barycenter and the vertices of the square, and the other image as an image of the second reference point.

15. The position measuring system according to claim 14, further comprising a reading unit that reads information indicated by an arrangement of the second reference point, from an image of the second reference point identified by the identification unit.

16. A position measuring system comprising:
an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;
an identification unit that identifies images of the first reference points and the second reference point captured by the image capturing unit, on the basis of positional relationships between the images of the first reference points and the second reference point; and
a calculation unit that calculates a three-dimensional position and three-axial angles of the object on the basis of positional relationships of the images of the first reference points identified by the identification unit, wherein the first reference points to be captured by the image capturing unit are provided respectively at vertices and a barycenter of a square, the second reference point to be captured by the image capturing unit is provided at a position that does not correspond to any of the vertices of the square and that does not form any parallelogram in combination with any three of the first reference points, and the identification unit identifies, as an image of one of the first reference points provided at the barycenter of the square, an image located at a position closest to a barycenter of a polygon formed by joining the images of the first reference points and the second reference point thus captured, identifies, as the images of the other first reference points provided at the vertices of the square, four images composed of two pairs of images symmetrically located with respect to the one of the first reference points provided at the barycenter of the square, and identifies the other image as an image of the second reference point.

17. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit, wherein the first reference points to be captured by the image capturing unit are respectively provided at adjacent four vertices and a barycenter of a regular hexagon, the second reference point to be captured by the image capturing unit is provided at a position that is opposite to the barycenter of the regular hexagon with respect to a middle side included in three continuous sides of the regular hexagon, the three continuous sides being formed by joining the four vertices of the regular hexagon, the position having a distance, from each of the vertices at both ends of the middle side, larger than a length of a side of the regular hexagon, and the identification unit extracts, from the images of the first reference points and the second reference point thus captured, images of three points arranged approximately on a line at regular intervals and images of two points located at a position closest to the line, identifies the images thus extracted as the images of the first reference points, and identifies the other image as an image of the second reference point.

18. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit, wherein the first reference points to be captured by the image capturing unit are respectively provided at adjacent four vertices and a barycenter of a regular hexagon, the second reference point to be captured by the image capturing unit is provided at a position that is opposite to, with respect to a line formed by joining two vertices at both ends among the four vertices and the barycenter of the regular hexagon, the other two vertices among the four vertices of the regular hexagon, the position having a distance, from each of the two vertices and the barycenter, longer than a side of the regular hexagon, and the identification unit identifies, as an image of one of the first reference points provided at the barycenter of the regular hexagon, an image located at a position closest to a barycenter of a polygon formed by joining the images of the first reference points and the second reference point thus captured, sets a vector from each of the other images to the one of the first reference points provided at the barycenter, translates each vector so as to have an initial point at the one of the first reference points provided at the barycenter, determines whether or not any image is located at a terminal point of each vector thus translated, identifies, as the images of the other first reference points provided at the vertices of the regular hexagon, images at respective initial points of vectors before the translation if the vectors each have an image located at the terminal point after the translation, and images of adjacent two points among initial points of vectors before the translation if the vectors each have no image located at the terminal point after the translation, and identifies the other image as an image of the second reference point.

19. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on the basis of positional relationships between the images of the first reference points and the second reference point; and a calculation unit that calculates a three-dimensional position and three-axial angles of the object on the basis of positional relationships of the images of the first reference points identified by the identification unit, wherein the first reference points to be captured by the image capturing unit are respectively provided at adjacent three vertices and a barycenter of a regular hexagon, the second reference point to be captured by the image capturing unit is provided at a position that is approximately on a line formed by joining one of the first reference points provided at the barycenter of the regular hexagon and another one of the first reference points provided at one of the vertices at an end of two continuous sides formed by joining the three vertices of the regular hexagon, the position being opposite to the another one of the first reference points with respect to the one of the first reference points provided at the barycenter, and the identification unit extracts three points arranged approximately on a line from the images of the first reference points and the second reference point thus captured, identifies, as an image of the second reference point, an image located at an end of a line formed by joining the three points thus extracted, when a polygon formed by joining all images is followed in a clockwise direction, identifies an image located in a middle of the three points thus extracted, as an image of one of the first reference points provided at the barycenter of the regular hexagon, and identifies the other images as the images of the other first reference points provided at the vertices of the regular hexagon.

20. A position measuring system comprising:

an image capturing unit that captures reference points provided on an object, the reference points composed of at least four first reference points provided respectively at vertices of a polygon or at vertices and a barycenter of a polygon and at least one second reference point provided so as to have a specific positional relationship with respect to the first reference points;

an identification unit that identifies images of the first reference points and the second reference point captured by the image capturing unit, on the basis of positional relationships between the images of the first reference points and the second reference point;

a calculation unit that calculates a three-dimensional position and three-axial angles of the object on the basis of positional relationships of the images of the first reference points identified by the identification unit; and a reading unit that reads information indicated by an arrangement of the second reference point, from an image of the second reference point identified by the identification unit, wherein the second reference point to be captured by the image capturing unit is provided at a position having a distance, from each vertex of a polygon formed by joining the first reference points, longer than a distance between a barycenter and each vertex of the polygon, and the identification unit identifies, as an image of the second reference point, an image located farthest from a barycenter of a polygon formed by joining the images of the first reference points and the second reference point thus captured, and identifies the other images as the images of the first reference points.

* * * * *